US010279853B2

(12) United States Patent
Filion et al.

(10) Patent No.: US 10,279,853 B2
(45) Date of Patent: May 7, 2019

(54) METHOD FOR REPLACING A ROLL CAGE OF AN OFF-ROAD VEHICLE

(71) Applicant: BOMBARDIER RECREATIONAL PRODUCTS INC., Valcourt (CA)

(72) Inventors: Simon Filion, Granby (CA); Jean Guillemette, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 51 days.

(21) Appl. No.: 15/681,773

(22) Filed: Aug. 21, 2017

(65) Prior Publication Data

US 2019/0031260 A1  Jan. 31, 2019

Related U.S. Application Data

(60) Provisional application No. 62/537,756, filed on Jul. 27, 2017.

(51) Int. Cl.
*B23P 6/00* (2006.01)
*B60R 21/13* (2006.01)
*B62D 65/02* (2006.01)

(52) U.S. Cl.
CPC ............. *B62D 65/02* (2013.01); *B23P 6/00* (2013.01); *B60R 21/13* (2013.01); *B62D 65/024* (2013.01); *B23P 2700/50* (2013.01); *B60R 2021/137* (2013.01); *Y10T 29/4973* (2015.01); *Y10T 29/49721* (2015.01); *Y10T 29/49726* (2015.01);
(Continued)

(58) Field of Classification Search
CPC ...... B62D 65/02; B62D 65/024; B62D 65/06; B23P 6/00; B23P 2700/50; B60R 21/13; B60R 2021/137; Y10T 29/49721; Y10T 29/49726; Y10T 29/49728; Y10T 29/4973; Y10T 29/49746; Y10T 29/49948; Y10T 29/49963
See application file for complete search history.

(56) References Cited

U.S. PATENT DOCUMENTS 4,135,591 A * 1/1979 Eberle ................ B60R 21/13
180/182
4,148,504 A * 4/1979 Rushing ............. B60R 21/13
182/153

(Continued)

OTHER PUBLICATIONS

BRP Recreational Products Inc.; 2013 Shop Manual—MaverickTM 1000R Series; 2013; Cover pages and pp. 406 to 408; Valcourt, Canada.

*Primary Examiner* — Jermie E Cozart
(74) *Attorney, Agent, or Firm* — BCF LLP

(57) ABSTRACT

A method for replacing a roll cage of an off-road vehicle is provided. The off-road vehicle has a frame and the roll cage affixed to the frame. The frame has a plurality of roll cage supports. The roll cage has a plurality of legs, and each of the legs is welded to a respective one of the roll cage supports of the frame. The method includes cutting off the roll cage from the frame, providing a replacement roll cage for removably affixing to the frame, positioning the replacement roll cage onto the frame such that legs of the replacement roll cage are supported on the roll cage supports, aligning an opening of a mounting flange of each leg of the replacement roll cage with a corresponding opening of each roll cage support, and fastening the legs of the replacement roll cage to the roll cage supports.

10 Claims, 24 Drawing Sheets

(52) U.S. Cl.
CPC .... *Y10T 29/49746* (2015.01); *Y10T 29/49963* (2015.01)

(56) References Cited

U.S. PATENT DOCUMENTS

| | | | | |
|---|---|---|---|---|
| 4,900,058 | A * | 2/1990 | Hobrecht | B60R 21/13 280/756 |
| 5,000,480 | A * | 3/1991 | Straka | B60Q 1/2611 280/756 |
| 8,548,710 | B1 * | 10/2013 | Reisenberger | B60K 28/04 180/268 |
| 2005/0251984 | A1 * | 11/2005 | Vickers | B23K 9/0026 29/402.08 |
| 2012/0193163 | A1 * | 8/2012 | Wimpfheimer | B60G 3/20 180/233 |
| 2014/0117653 | A1 * | 5/2014 | Deschambault | B60R 21/13 280/756 |

* cited by examiner

METHOD FOR REPLACING A ROLL CAGE OF AN OFF-ROAD VEHICLE

CROSS-REFERENCE

The present application claims priority to U.S. Provisional Patent Application No. 62/537,756, filed Jul. 27, 2017, entitled "Roll Cage Of An Off-Road Vehicle," the entirety of which is incorporated herein.

FIELD OF TECHNOLOGY

The present technology relates to a roll cage of an off-road vehicle, and in particular to the replacement of such a roll cage.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit and a roll cage surrounding the cockpit to protect the driver and passenger.

The roll cage may be damaged during use and, depending on the severity of the resulting damage, may need to be replaced. However, replacing the roll cage can be a complex and time-consuming procedure, requiring a technician performing the replacement to have much equipment readily available. As a corollary, this may also make it expensive to replace the roll cage. These problems are exacerbated in the case where the roll cage is welded to the vehicle frame.

There is therefore a need for a method of replacing the roll cage of an off-road vehicle.

SUMMARY

It is an object of the present technology to ameliorate at least some of the inconveniences present in the prior art.

According to various aspects of the present technology, there is provided a method for replacing a roll cage of an off-road vehicle. The roll cage is originally welded onto a frame of the vehicle. The method includes cutting off the roll cage from the frame of the vehicle, removing residue material of the roll cage from the frame, and providing a replacement roll cage which is then fastened to the frame. This may allow a relatively simple roll cage replacement procedure.

According to one aspect of the present technology, there is provided a method for replacing a roll cage of an off-road vehicle. The off-road vehicle has a frame and the roll cage affixed to the frame. The frame comprises a plurality of roll cage supports. The roll cage has a plurality of legs. Each of the legs is welded to a respective one of the roll cage supports of the frame. The method includes cutting off the roll cage from the frame. The method also includes providing a replacement roll cage for removably affixing to the frame. The replacement roll cage has a plurality of legs for removably affixing to the roll cage supports of the frame. Each leg of the replacement roll cage has a mounting flange which has an opening for receiving a fastener. The method also includes positioning the replacement roll cage onto the frame such that the legs of the replacement roll cage are supported on the roll cage supports, aligning the opening of the mounting flange of each leg of the replacement roll cage with a corresponding opening of each roll cage support, and fastening the legs of the replacement roll cage to the roll cage supports.

In some implementations of the present technology, said cutting includes cutting each leg of the roll cage at a point above a respective roll cage support.

In some implementations of the present technology, the point above which each leg of the roll cage is cut is above a weld between the leg and the respective roll cage support.

In some implementations of the present technology, the point above which each leg of the roll cage is cut is up to 10 mm from an upper surface of the respective roll cage support.

In some implementations of the present technology, the method also includes removing residue material of the roll cage left on the roll cage supports after said cutting.

In some implementations of the present technology, said removing includes grinding the residue material of the roll cage.

In some implementations of the present technology, the method also includes buffing the roll cage supports of the frame after said removing.

In some implementations of the present technology, the method also includes applying a protective coating to the roll cage supports after said removing.

In some implementations of the present technology, said positioning includes placing a lower surface of the mounting flange of each leg of the replacement roll cage in parallel with an upper surface of a corresponding one of the roll cage supports.

In some implementations of the present technology, said fastening includes: inserting a fastener into the opening of the mounting flange of each leg of the replacement roll cage and into the corresponding opening of the roll cage support; and securing the fastener with a fastener receiving member.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
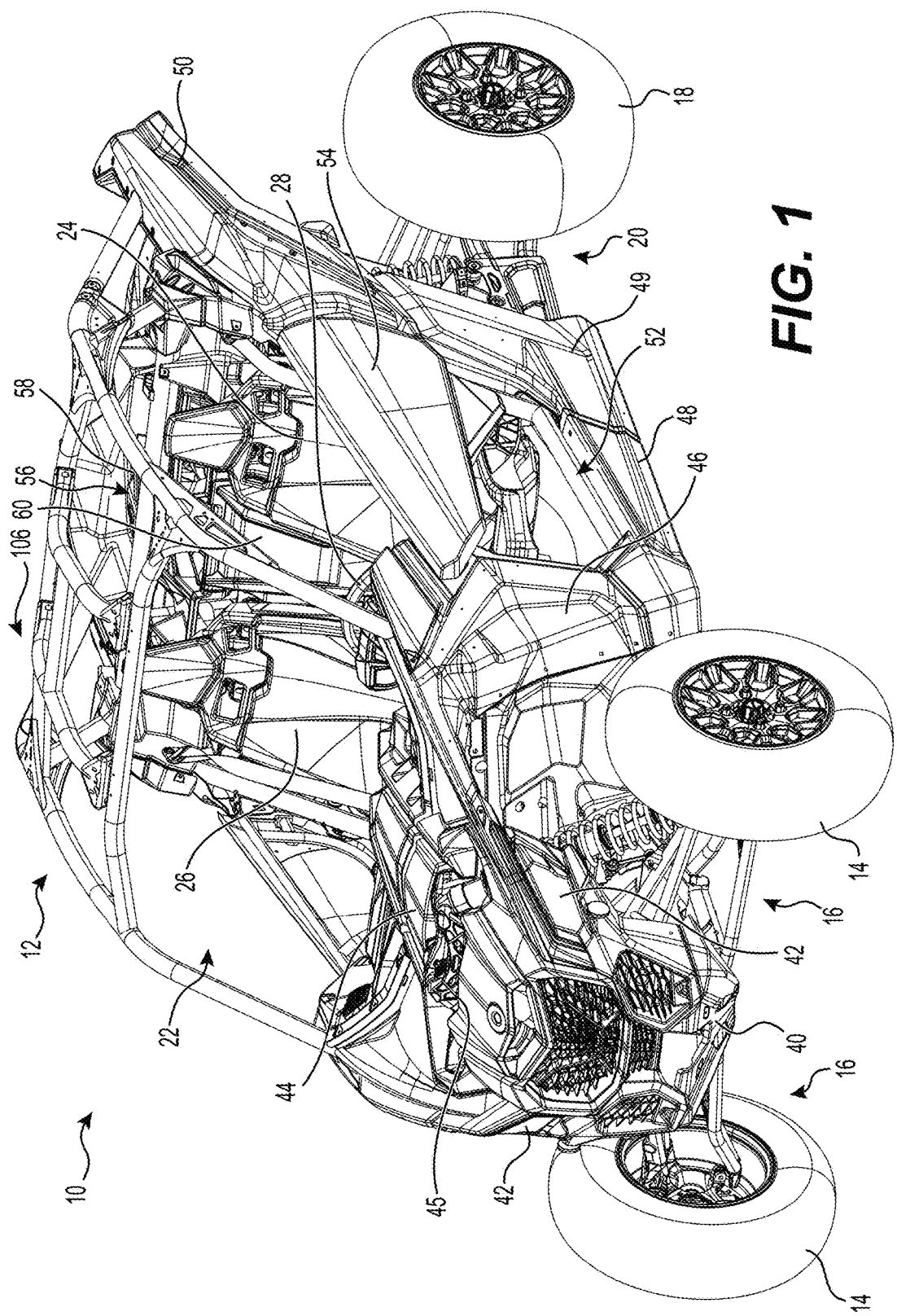
FIG. 1 is a front, left side perspective view of an off-road vehicle.

The present technology will be described with respect to a four-wheel off-road vehicle 10 having two side-by-side seats and a steering wheel. However, it is contemplated that some aspects of the present technology may apply to other types of vehicles such as, but not limited to, off-road vehicles having a handlebar and a straddle seat (i.e. an all-terrain vehicle (ATV)) and off-road vehicles having more or less than four wheels.

The general features of the off-road vehicle 10 will be described with respect to FIGS. 1 to 5. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10.

The vehicle 10 comprises a steering assembly, including a steering wheel 28 that is disposed in front of the driver seat 24. The steering wheel 28 is used to turn the front wheels 14 to steer the vehicle 10. A user interface of the vehicle includes various displays and gauges 29 disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 5:
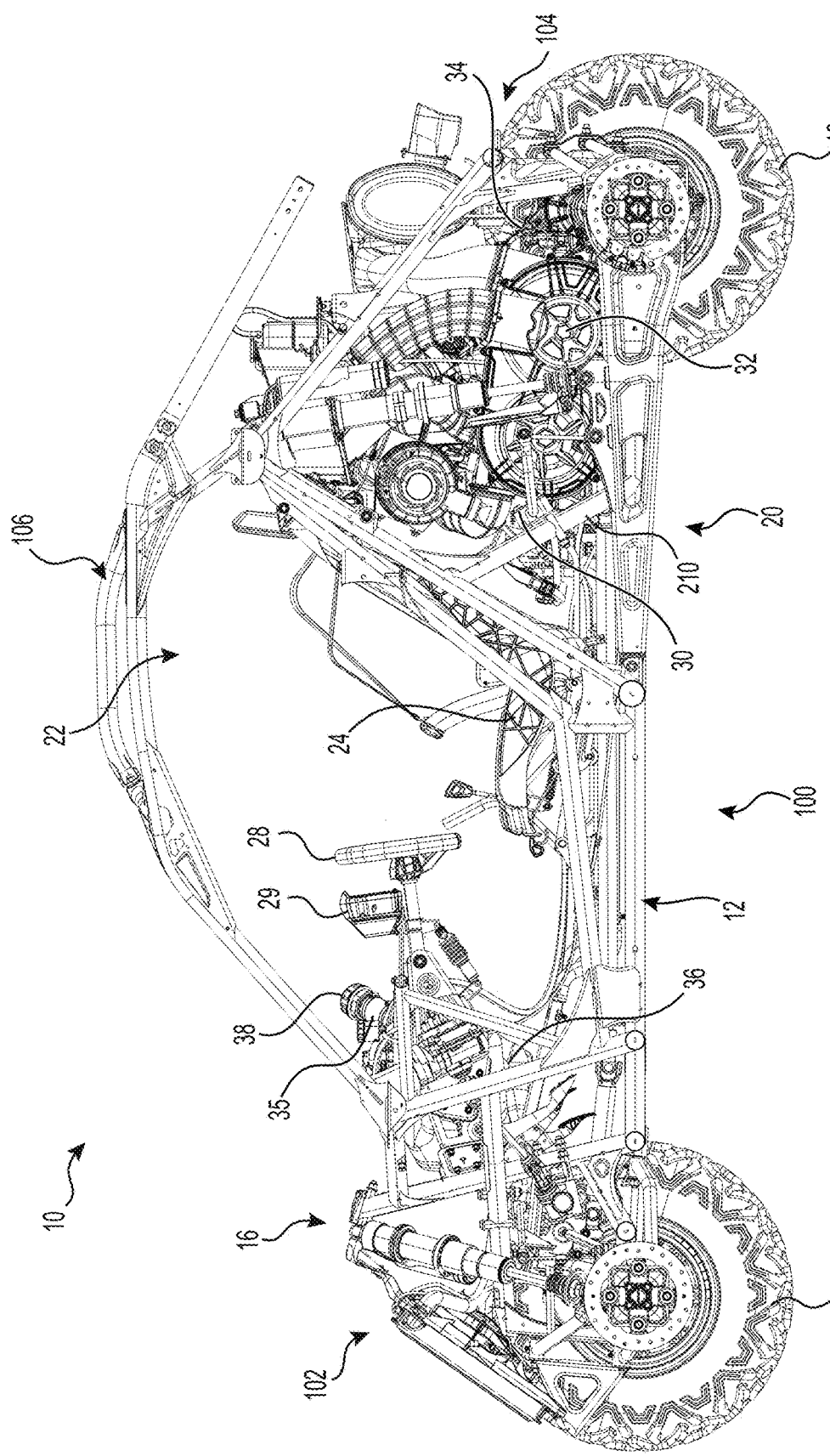
FIG. 5 is a left side elevation view of the vehicle of FIG. 1 with body panels and the left wheels removed.

As shown in FIG. 5, the vehicle 10 comprises an engine 30 connected to the frame 12 in a rear portion of the vehicle 10. The engine is an in-line, three-cylinder, four-stroke internal combustion engine. It is contemplated that other types of internal combustion engines could be use, such as a V-twin or a two-stroke internal combustion engine for example. It is also contemplated that in some implementations, the engine 30 could be replaced by another type of motor such as a diesel engine or an electric motor for example.

With continued reference to FIG. 5, the engine 30 is connected to a continuously variable transmission (CVT) 32 disposed on a left side of the engine 30. The CVT 32 is operatively connected to a transaxle 34 to transmit torque from the engine 30 to the transaxle 34. The transaxle 34 is disposed behind the engine 30. The transaxle 34 is operatively connected to the front and rear wheels 14, 18 to propel the vehicle 10. A fuel tank 36 is suspended from the frame 12 in front of the driver seat 26. The fuel tank 36 is disposed above a floor of the cockpit area 22 to the right of a longitudinal centerline 37 of the vehicle 10 (shown in FIG. 4B). A filler neck 35 that is selectively closed by a cap 38 extends upward, rightward and rearward from a top, right and rear portion of the fuel tank 36. A fuel pump (not shown) is inserted through a top of the fuel tank 36.

The vehicle 10 also comprises an exhaust system for expelling exhaust gases from the engine 30. The exhaust system includes a muffler for decreasing the amount of noise emitted by the exhaust system.

Figure 2:
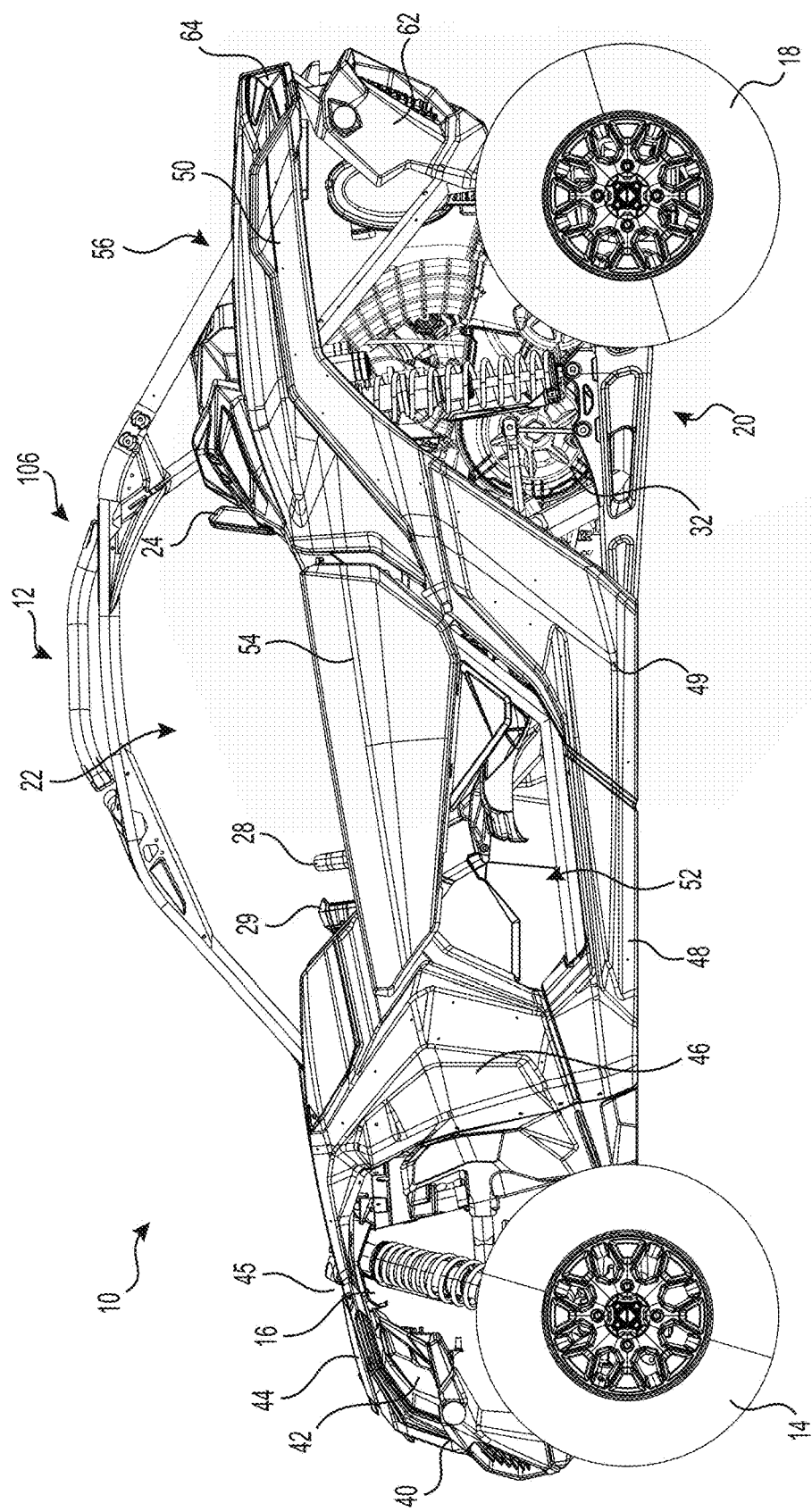
FIG. 2 is a left side elevation view of the vehicle of FIG. 1.
Figure 3:
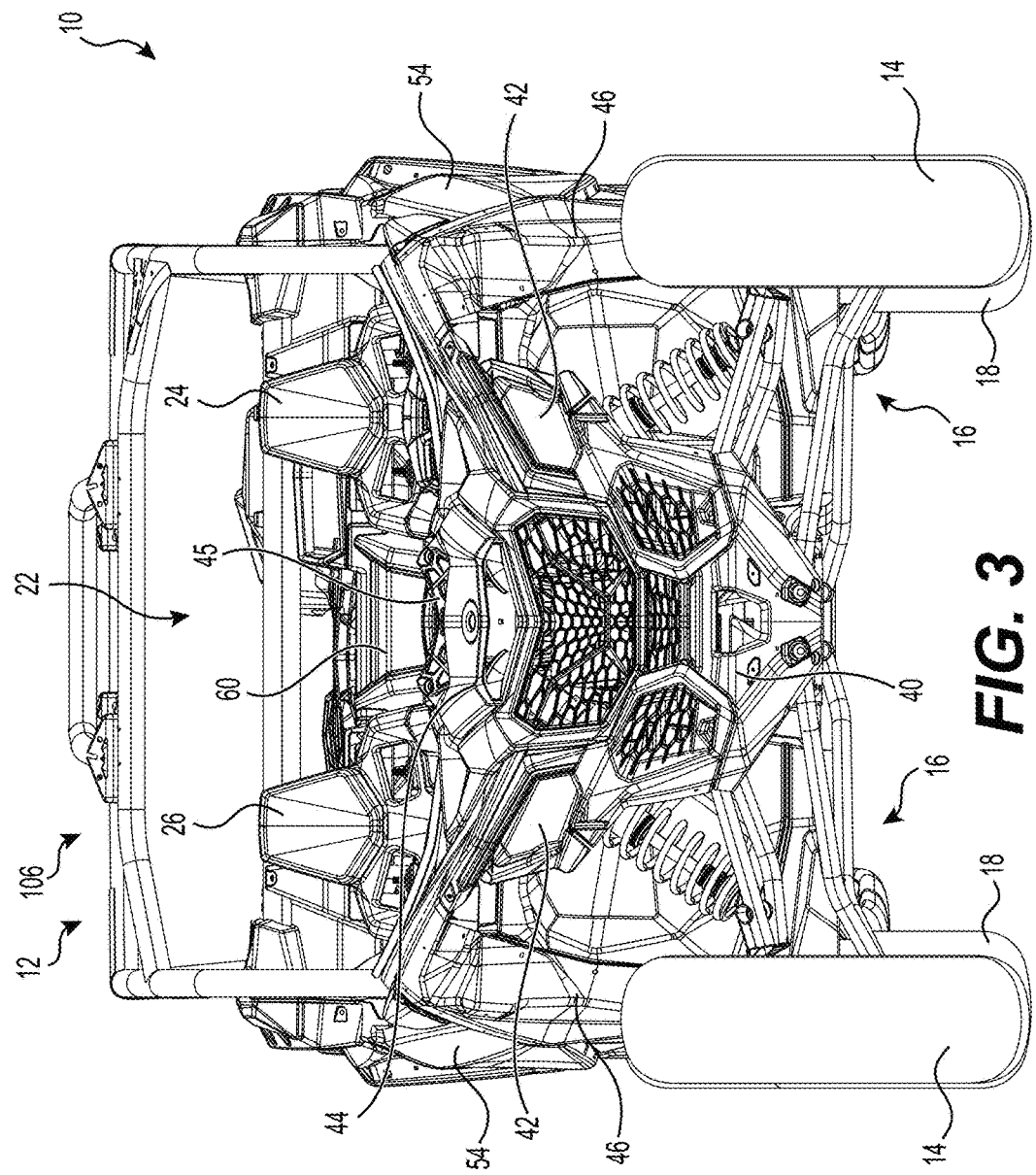
FIG. 3 is a front elevation view of the vehicle of FIG. 1.

Turning back to FIGS. 1 to 4B, the vehicle 10 comprises body panels connected to the frame 12. The panels help protect the internal components of the vehicle 10 and provide some of the aesthetic features of the vehicle 10. Notably, front panels 40 are connected to a front of the frame 12 and define apertures inside which headlights 42 of the vehicle 10 are disposed. A cover 44 extends generally horizontally rearward from a top of the front panels 40. Front fenders 46 are disposed rearward of the front panels 40 on each side of the vehicle 10. Lower panels 48 extend along the bottom of the frame 12 between the front and rear wheels 14, 18. As shown in FIG. 2, each lower panel 48 has a front end disposed under the bottom portion of its corresponding front fender 46 and extends rearward therefrom. A generally L-shaped panel 49 is disposed behind the rear end of each lower panel 48. Generally L-shaped rear fenders 50 extend upward and then rearward from the rear, upper ends of the L-shaped panels 49 and define apertures to receive brake lights 64 of the vehicle 10.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52.

Figure 4A:
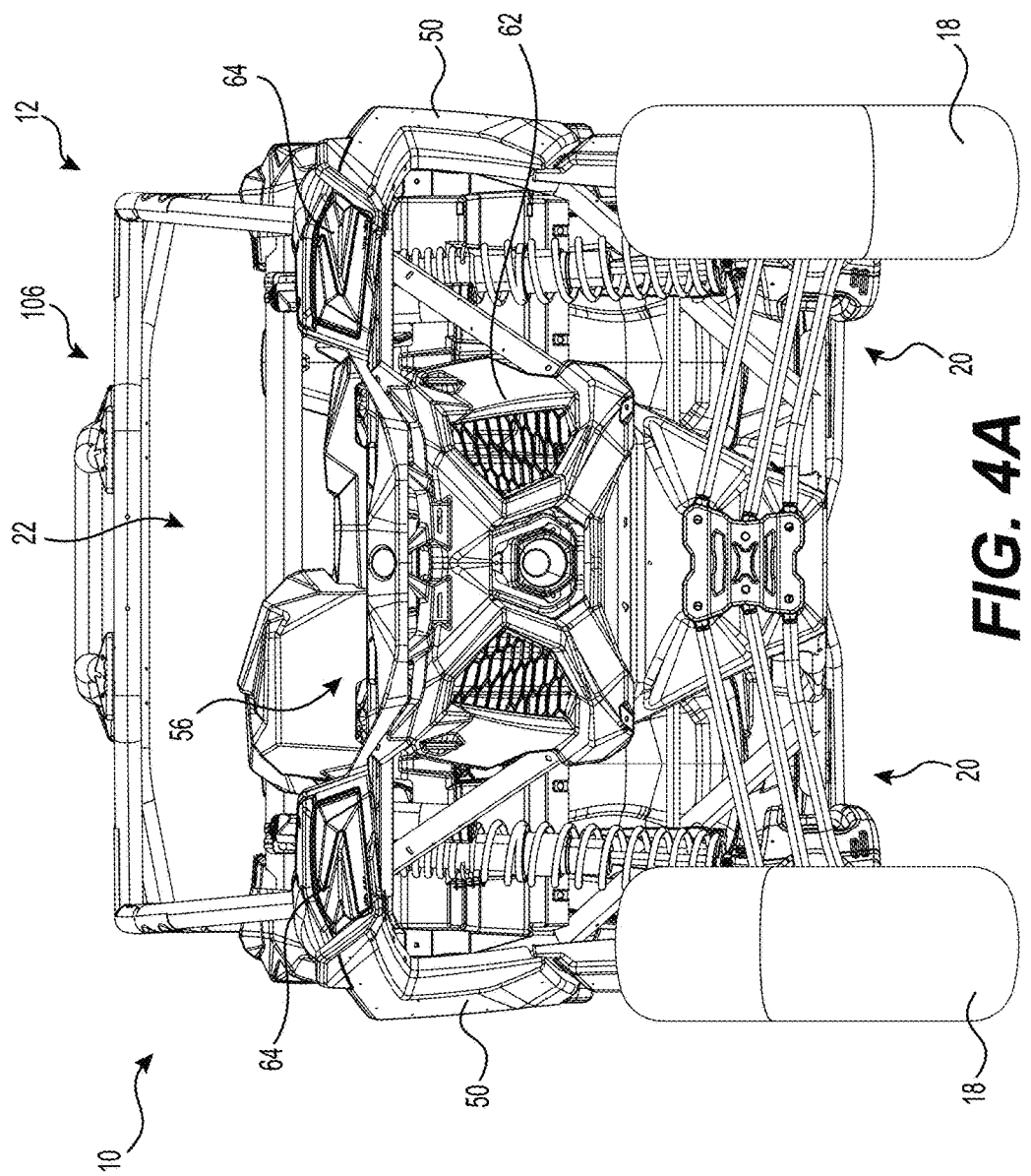
FIG. 4A is a rear elevation view of the vehicle of FIG. 1.
Figure 4B:
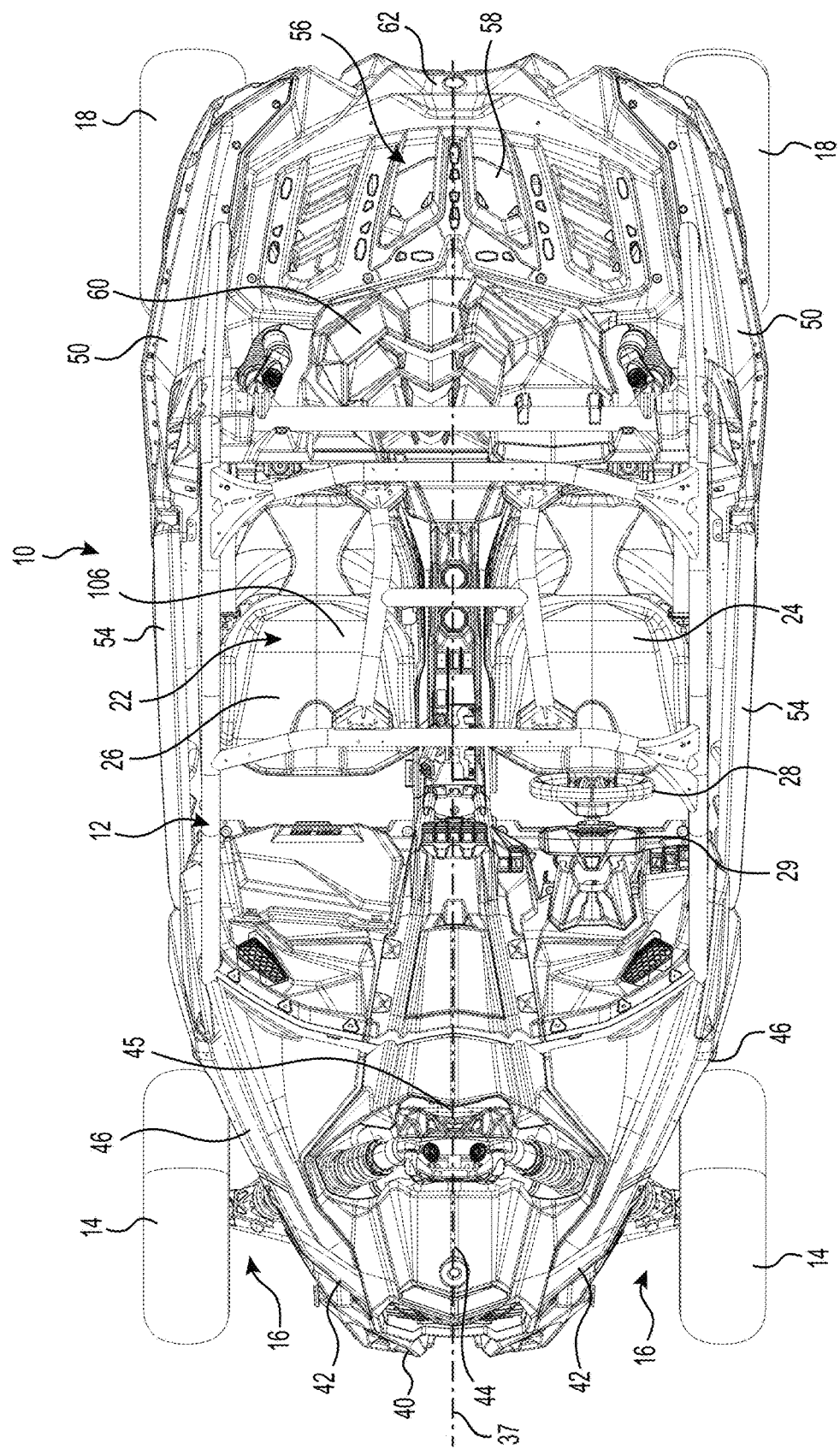
FIG. 4B is a top plan view of the vehicle of FIG. 1.

As best seen in FIG. 4B, the rear fenders 50 define a cargo space 56 therebetween behind the seats 24, 26. The cargo space 56 has a floor 58 extending horizontally between the rear fenders 50. A separation panel 60 extends laterally and is disposed longitudinally between the seats 24, 26 and the floor 58. As a result, the separation panel 60 separates the cockpit area 22 from the cargo area 56. As best seen in FIGS. 4A and 4B, rear panels 62 are disposed laterally between the rear wheels 18 behind the floor 58.

With reference to FIGS. 6 to 13, the frame 12 of the vehicle 10 has a central portion 100, a front portion 102 and a rear portion 104. As their names suggest, the front portion 102 is disposed in front of the central portion 100 and the rear portion 104 is disposed behind the central portion 100. The central portion 100 defines the cockpit area 22 in which the seats 24, 26 are disposed. As will be described in more detail below, a roll cage 106 of the vehicle 10 is connected to the central portion 100 of the frame 12. The front suspension assemblies 16 are connected to the central and front portions 100, 102. The engine 30, the CVT 32 and the transaxle 34 are supported by the rear portion 104 of the frame 12. The rear suspension assemblies 20 are connected to the central and rear portions 100, 104 of the frame 12.

The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

Figure 10:
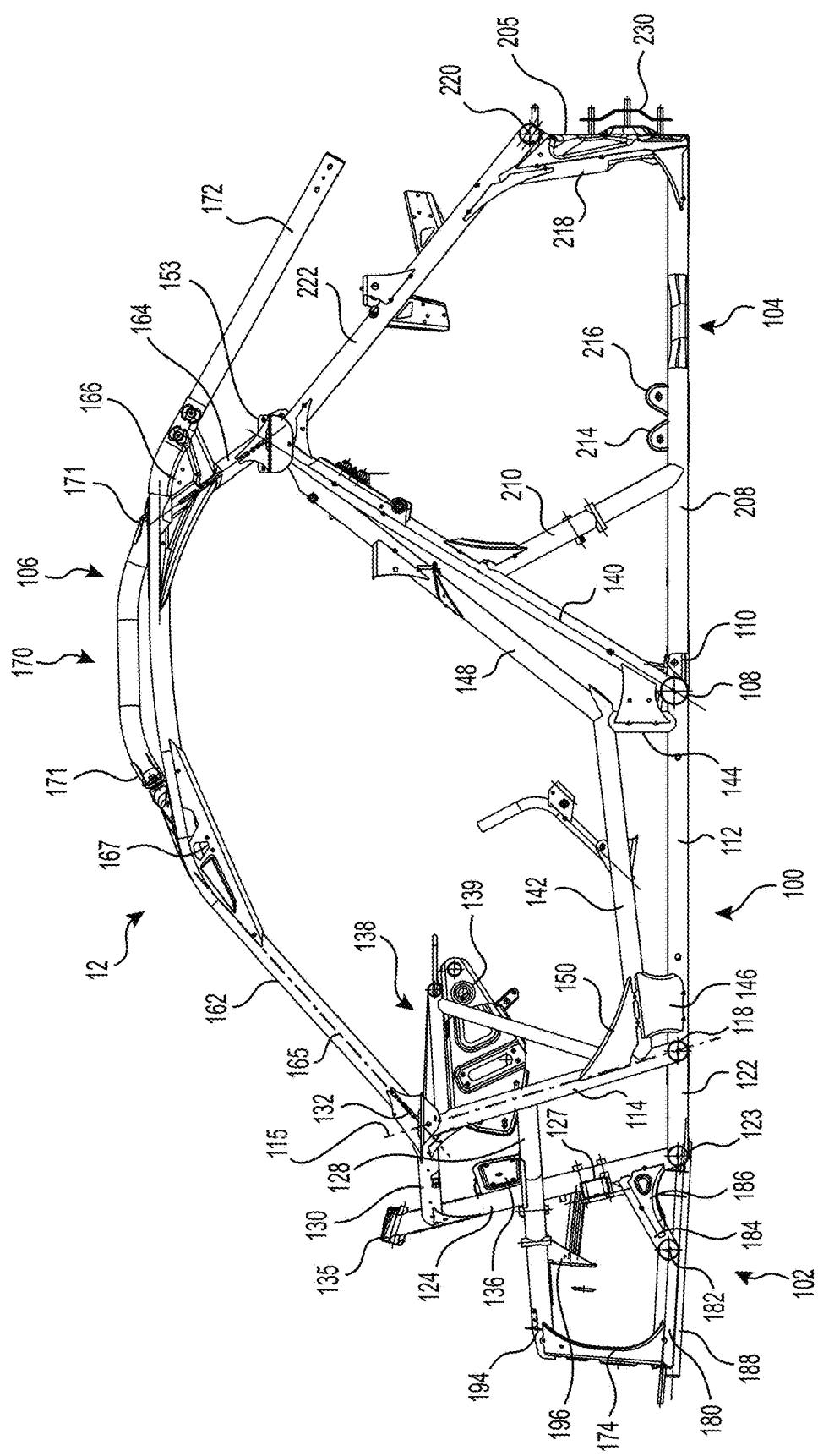
FIG. 10 is a left side elevation view of the frame and the roll cage of FIG. 9.
Figure 11:
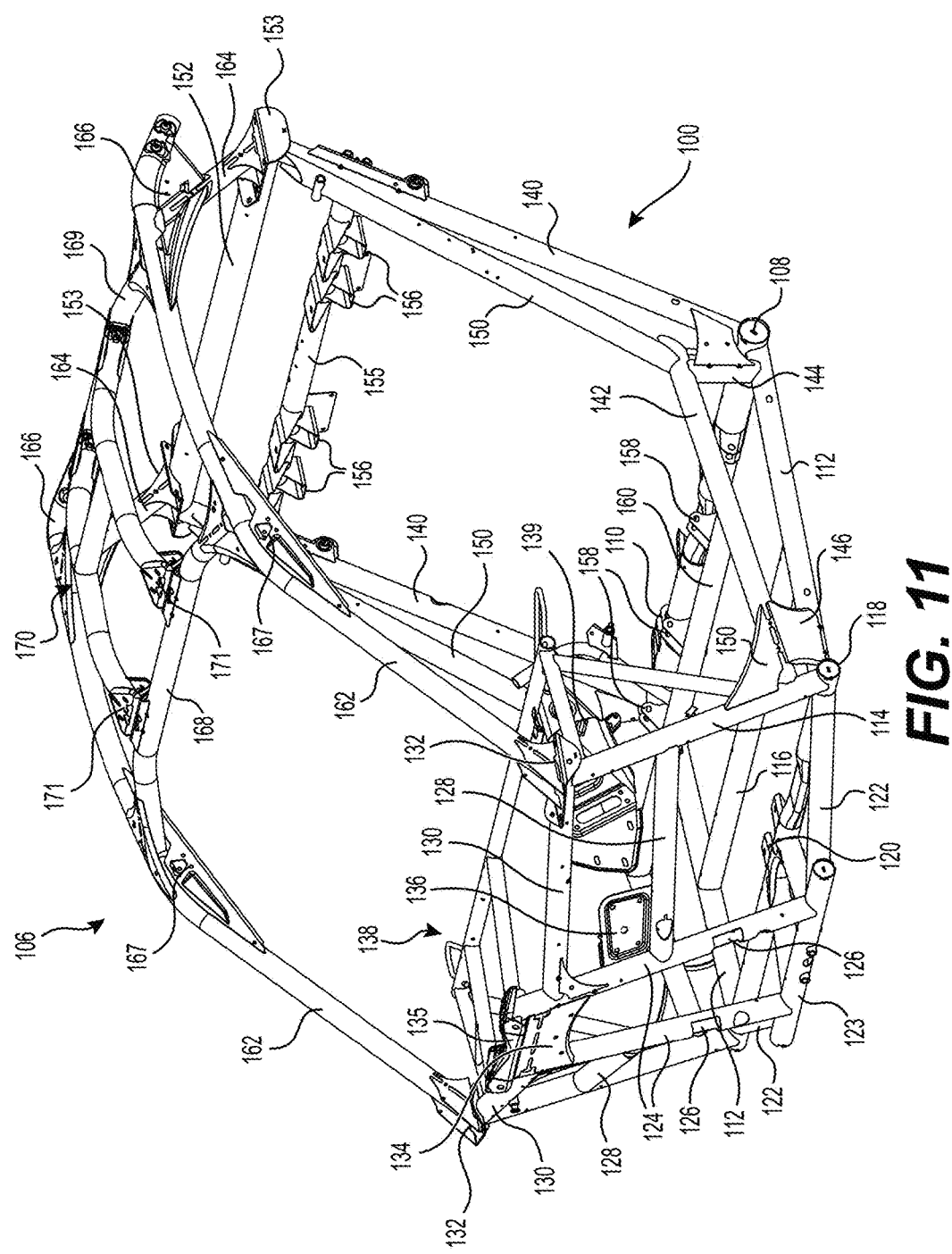
FIG. 11 is a front, left side perspective view of a central portion of the frame with the roll cage affixed thereto.
Figure 12:
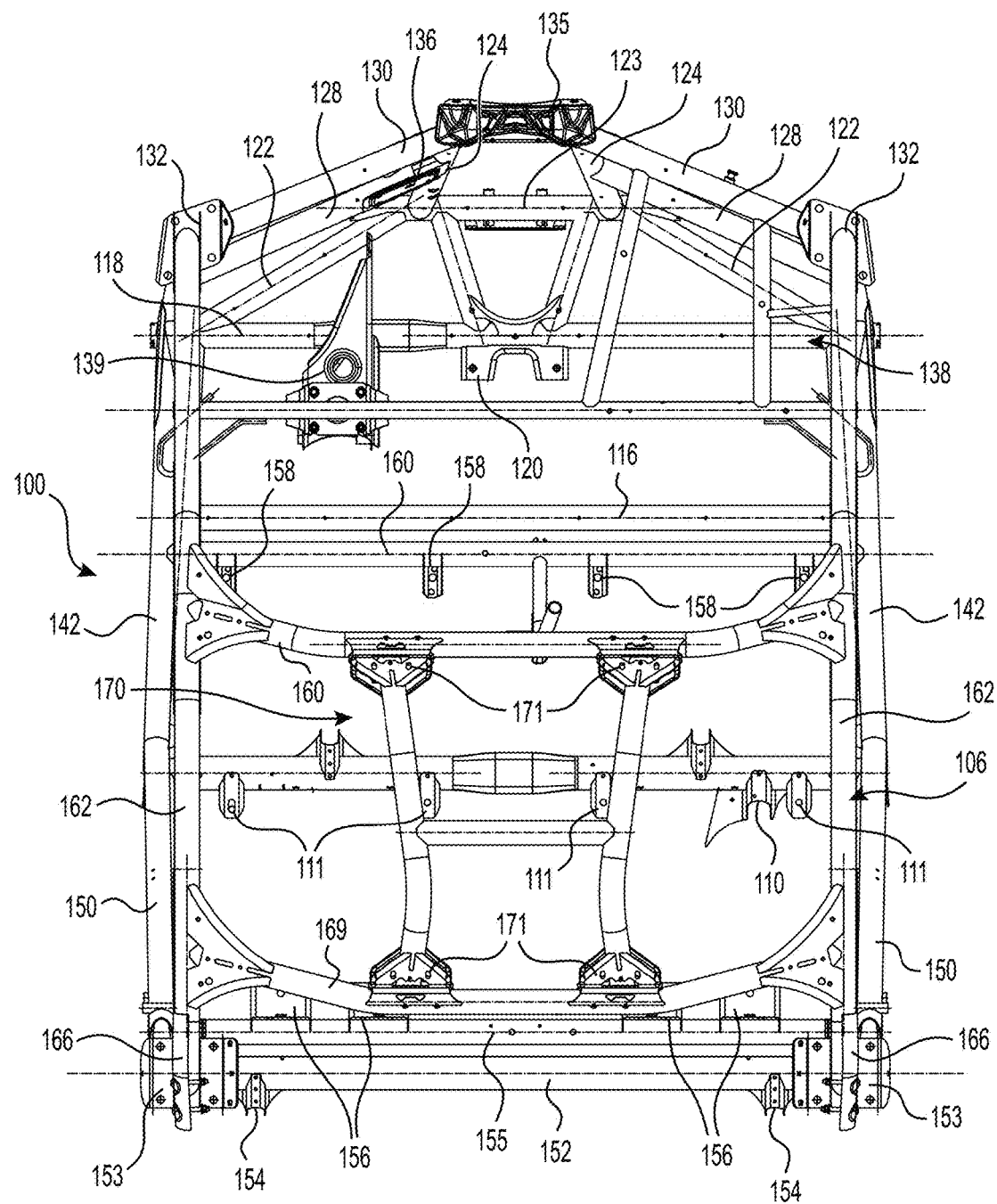
FIG. 12 is a top plan view of the central portion of the frame and the roll cage of FIG. 11.

With reference to FIGS. 6 and 9 to 12, the central portion 100 has a laterally extending bottom member 108. Brackets 110, 111, best seen in FIG. 12, are connected to the rear of the bottom member 108 and are respectively used to connect the rear suspension assemblies 20 and the rear of the seats 24, 26. Two bottom members 112 are connected at their rear ends to the ends of the bottom member 108. The bottom members 112 extend forward and laterally inward from the bottom member 108. A laterally extending bottom member 116 is disposed forward of the bottom member 108 and is connected to and extends between the two bottom members 112. The front ends of the bottom members 112 are connected to the rear of another laterally extending bottom member 118 which is disposed forward of the bottom member 116. A bracket 120 connected to the bottom member 118 supports a portion of the powertrain of the vehicle 10. Generally vertical members 114 extend upward from the ends of the laterally extending bottom member 118. Diagonal members 122 extend forward and laterally inward from the ends of the laterally extending member 118 and connect at their front ends to a laterally extending member 123. The members 108, 112, 114, 116, 118, 122 and 123 are straight.

From their bottom ends, the generally vertical members 114 extend upward, forward and laterally inward. Two other generally vertical members 124 disposed forward of the members 114 are connected at their bottom ends to the top of the laterally extending bottom member 123. From their bottom ends, the generally vertical members 124 extend upward, forward and laterally inward. As seen in FIG. 10, the top ends of the generally vertical members 124 are vertically higher than the top ends of the generally vertical members 114. Each generally vertical member 124 has a notch 126 in a front thereof. A rectangular hollow member 127 (see FIG. 10) is received in the notches 126 and is connected to the vertical members 114. For each pair of a generally vertical member 114 and its corresponding generally vertical member 124, straight horizontal members 128 and 130 are connected to and extend between the generally vertical members 114, 124. The horizontal members 130 are disposed vertically higher than the horizontal members 128. The horizontal members 130 are connected to the top ends of the generally vertical members 114 and below the top ends of the generally vertical members 124.

A bracket 134, as best shown in FIG. 11, is connected to and extends between the generally vertical members 124. Another bracket 135 is connected to the top ends of the vertical members 124. The members 114, 122, 123, 124, 128 and 130 and the bracket 134 form a barrier at a front of the cockpit area 22. A plate 136 is connected to a top of the left horizontal member 128 and to the left of the left generally vertical member 124. The plate 136 is used to connect various components of the braking system to the frame 12, such as the master cylinder (not shown).

A support frame structure 138 is disposed behind and is connected to the barrier formed by the members 114, 122, 123, 124, 128 and 130. The frame structure 138 is used to connect a bracket 139 used to support the steering wheel 28 on a left side thereof and to connect the fuel tank 36 on a right side thereof. The frame structure 138 is made of a plurality of members. The legs of the frame structure 138 are connected to the generally vertical members 124 and extend upward and rearward therefrom as can be seen in FIG. 11.

Rear members 140 extend upward and rearward from the ends of the bottom member 108. Side members 142 are connected to and extend upward and rearward from vertical members 114. Cross-members 144 extend between and are connected to the rear portions of the bottom members 112 and of the side members 142. Each side member 142 and its corresponding bottom member 112 is provided with a bracket 146 extending between and connected to the front portions of the members 142, 112. Side members 148 are connected to the upper portion of the rear members 140. From the rear members 140, the side members 148 extend downward and forward and connect to the rear ends of the side members 142. Brackets 150 connect the front portions of the side members 142 to the generally vertical members 114. A laterally extending member 152 is connected to the tops of the rear members 140. As best seen in FIG. 12, brackets 154 are connected to the back of the member 152 and are used to connect a portion of the rear suspension assemblies 20. Another laterally extending member 155 is connected between the rear members 140 below the laterally extending member 152. Brackets 156 are connected to the laterally extending member 155 and are used to connect seat belt mechanisms of the seats 24, 26.

Figure 6:
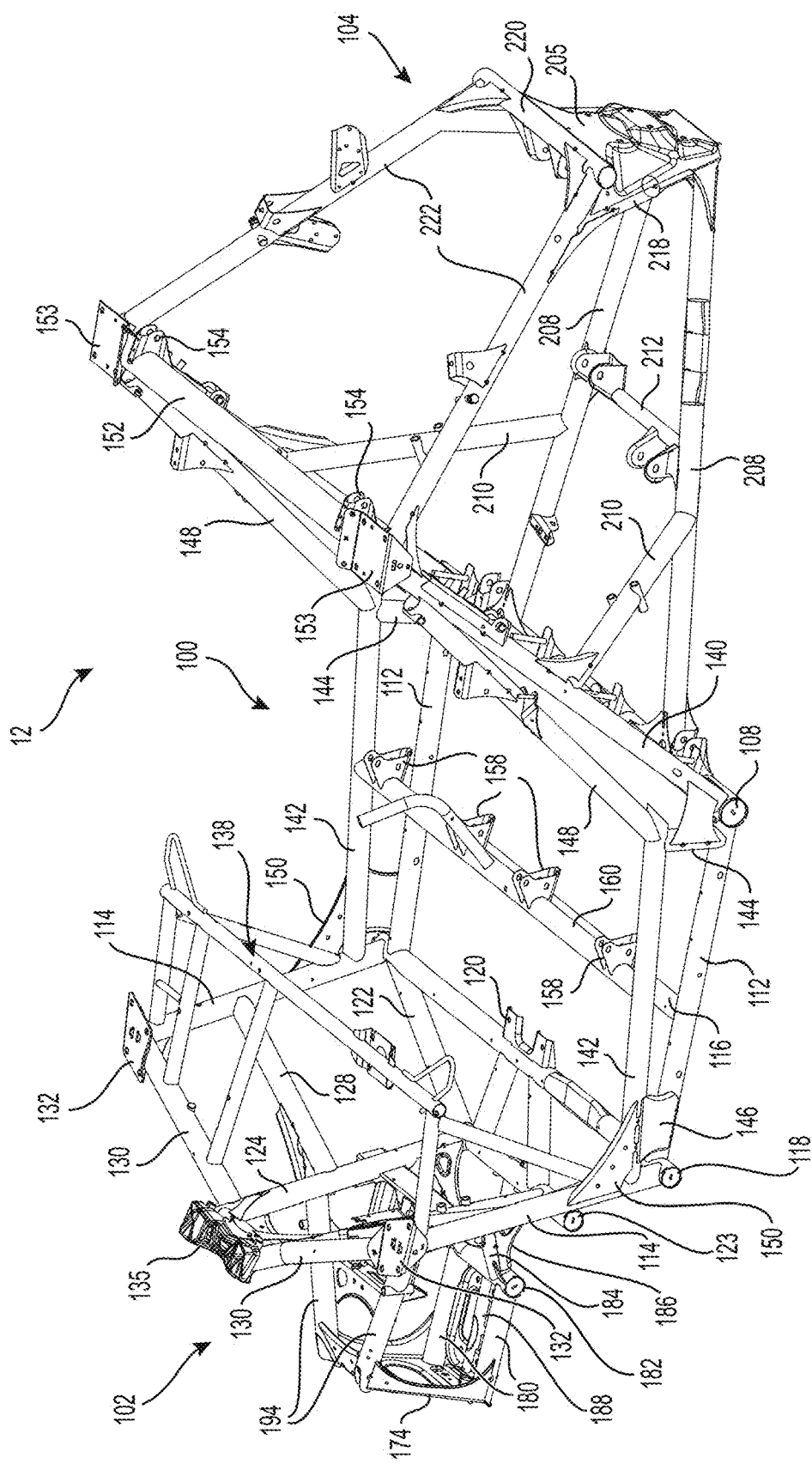
FIG. 6 is a rear, left side perspective view of a frame of the vehicle of FIG. 1.

As best seen in FIG. 6, a laterally extending member 160 extends between and connects to the side members 142 such that the member 160 is vertically spaced from and parallel to the bottom member 116. The brackets 158 are connected to the member 160 and are used to fasten the seats 24, 26 to the central portion 100 of the frame 12.

Figure 13A:
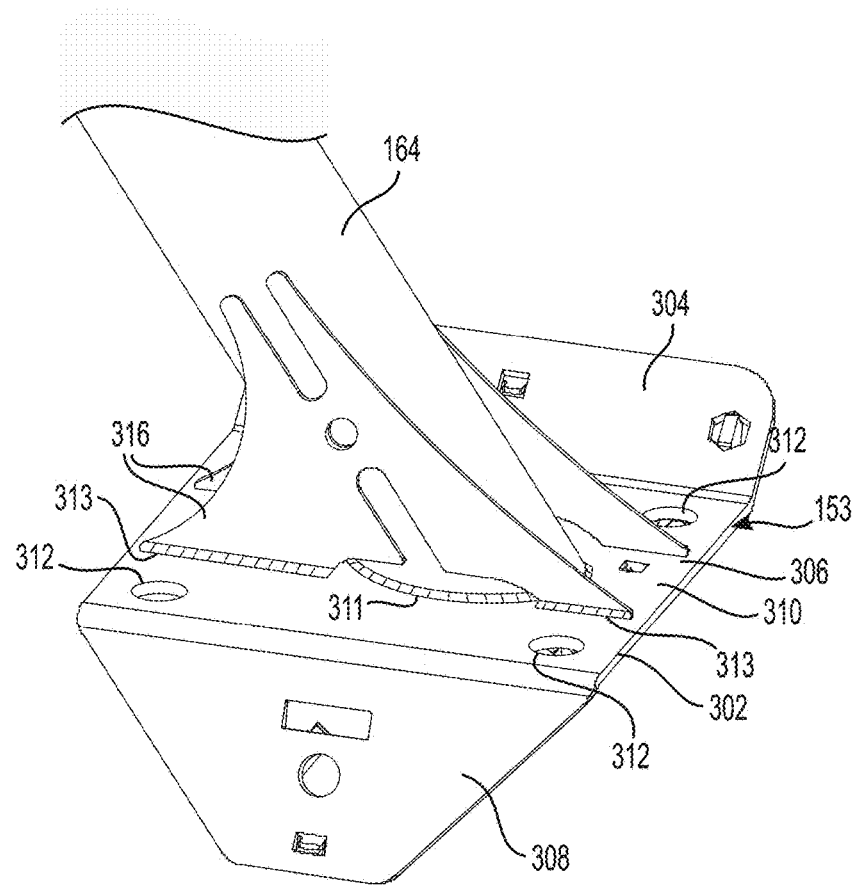
FIG. 13A is a perspective view of the rear, left roll cage support with a rear, left leg of the roll cage affixed thereto.

The central portion 100 of the frame 12 comprises a pair of front roll cage supports 132 and a pair of rear roll cage supports 153 configured for supporting the roll cage 106 in a manner that will be described in more detail further below. As shown in FIG. 13C, the front roll cage supports 132 are connected to the top of notches 175 formed in laterally outer ends of the members 130 (only one of which is shown in FIG. 13C). More specifically, each notch 175 defines a straight upper surface 177 (consisting of the edges formed by the notch 175) to which the front roll cage supports 132 can be more easily welded to compared to a curved outer surface 131 of each member 130. Similarly, the rear roll cage supports 153 are connected to the top of notches (not shown) formed in the ends of the member 152.

With reference to FIGS. 6, 10 and 11, the front portion 102 comprises a front bracket 174 having a set of apertures for connecting the front suspension assemblies 16. Two longitudinally extending members 180 connect to and extend rearward and slightly downward from the lower corners of the bracket 174. A laterally extending member 182 connects to the rear ends of the members 180. Two members 184 connect to the member 182 at positions that are laterally inward of the positions where the members 180 connect to the member 182. From the member 182, the members 184 extend upward, rearward and laterally outward. Generally triangular brackets 186 are connected to the members 184 and are disposed below the members 184. The brackets 186 are connected to the vertical members 124 of the central portion 100 of the frame 12 below the notches 126.

A longitudinally extending member 188 is connected to the center of the bottom of the bracket 174 and to the center of the bottom of the laterally extending member 182. The member 188 is parallel to the members 180. As can be seen in FIG. 10, the member 188 extends rearward of the member 182. The member 188 defines a notch in a rear portion thereof in which the bottom member 123 of the central portion 100 of the frame 12 is received and is thus connected to the member 188. Plates are provided on either sides of the member 188. Each plate is connected to the bracket 174, the member 182 and its respective member 180 to close the opening defined between these components.

Two members 194 connect to and extend rearward, upward and laterally outward from the upper corners of the bracket 174. A bracket 196 (see FIG. 10) is connected between the front portions of the members 194 rearward of the bracket 174. The rear ends of the members 194 have notches inside which are received the horizontal members 128 of the central portion 100 of the frame 12 to connect the members 194 to the horizontal members 128.

With reference to FIGS. 6 and 10, the rear portion 104 has a mounting bracket 205. Two bottom members 208 connect to and extend forward and laterally outward from the lower corners of the mounting bracket 205. The front ends of the members 208 are connected to the rear of the bottom member 108 of the central portion 100 of the frame 12. The members 208 are connected to the bottom member 108 at positions that are laterally inward of the brackets 110. Two members 210 are connected at their bottom ends to the bottom members 208, extend upward, forward and outward therefrom and connect at their top ends to the rear members 140 of the central portion 100 of the frame 12. A laterally extending member 212 extends between the members 208 at a position longitudinally between the bottom member 108 and the mounting bracket 205. Brackets 214, 216 are connected to the member 212 and are used to connect the engine 30 to the rear portion 104 of the frame 12.

Two members 218 are connected to the rear ends of the members 208. From the members 208, the members 218 extend upward, forward and laterally outward. The members 218 extend along the front portion of the bracket 205 as shown in FIG. 10. Two members 222 are connected to the top ends of the members 218. A laterally extending member 220 is connected to the rear ends of the members 222 and is located on top of the bracket 205. The member 220 is disposed rearward of the members 218 and lower than the top ends of the members 218. The two members 222 are connected near the ends of the member 220. From the member 220, the members 222 extend forward, upward and laterally outward. The top ends of the members 222 are connected to the ends of the member 152 of the central portion 100 of the frame 12.

Figure 7:
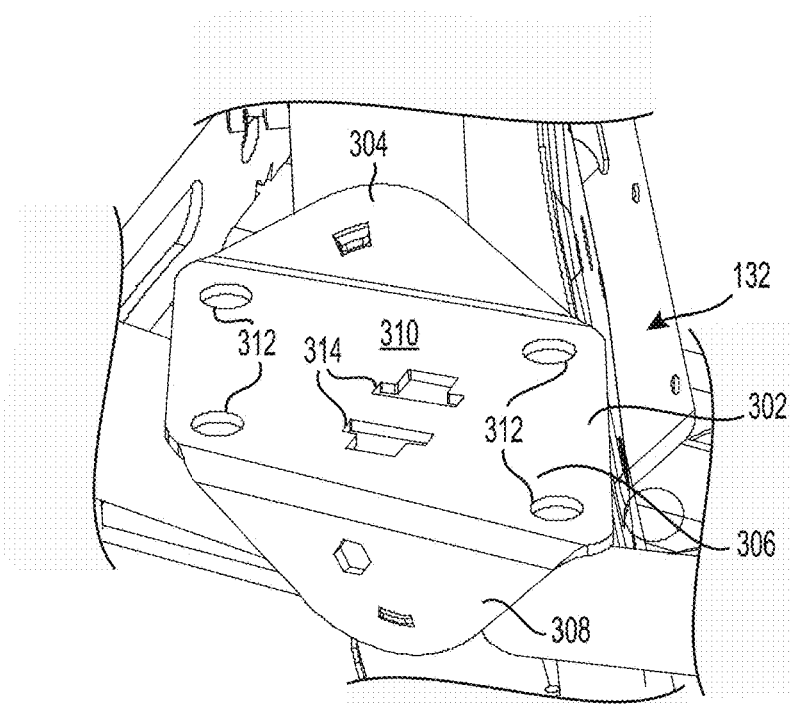
FIG. 7 is a perspective view of a front, left roll cage support of the frame.
Figure 8:
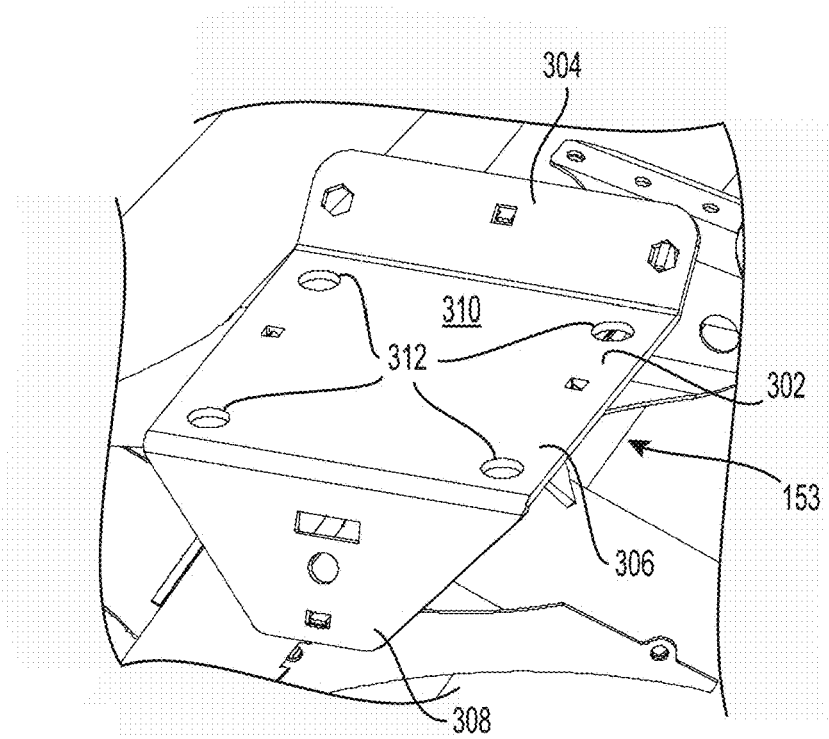
FIG. 8 is a perspective view of a rear, left roll cage support of the frame.

The roll cage 106 is attached to the central portion 100 of the frame 12 via the front and rear roll cage supports 132, 153. As best shown in FIGS. 7 and 8, the front and rear roll cage supports 132, 153 are similar. Notably, each of the front and rear roll cage supports 132, 153 comprises a bracket 302 having laterally proximal, central and distal portions 304, 306, 308. The proximal portion 304 is closest to the centerline 37 of the vehicle 10 while the distal portion 308 is furthest from the centerline 37. The central portion 306 of the bracket 302 has an upper surface 310 and a lower surface 307, each of which is substantially horizontal. The lower surface 307 of the bracket 302 is welded to an upper surface of the notch formed in the corresponding one of the members 130, 152 (the upper surface 177 shown in FIG. 13C in the case of the front roll cage supports 132). The proximal and distal portions 304, 308 are angled relative to the upper surface 310 of the bracket 302. In particular, the proximal portion 304 is bent upwards while the distal portion 308 is bent downwards. The angled proximal and distal portions 304, 308 provide rigidity to the bracket 302 and, as will be explained in more detail below, may facilitate replacement of the roll cage 106. The central portion 306 of the bracket 302 also includes openings 312 in the upper surface 310 which are used during replacement of the roll cage 106.

It is noted that, while the left front and rear roll cage supports 132, 153 are shown and described herein, the right front and rear roll cage supports 132, 153 are a mirror images of the left front and rear roll cage supports. The right front and rear roll cage supports 132, 153 will therefore not be described here.

As shown in FIG. 7, the bracket 302 of the front roll cage supports 132 comprises alignment openings 314 in the central portion 306 of the bracket 302. The alignment openings 314 are used to align the roll cage 106 with the front roll cage supports 132 when the roll cage 106 is being attached to the frame 12 as will be described in more detail below. In this implementation, the bracket 302 of the rear roll cage supports 153 does not comprise the alignment openings 314, however it is contemplated that it could in alternative implementations.

With reference to FIG. 10, the roll cage 106 comprises front legs 162 and rear legs 164 which are connected to the frame 12. The front and rear legs 162, 164 are generally elongated members having upper ends and lower ends. The roll cage 106 also comprises connectors 166 that connect the front legs 162 to the rear legs 164. Specifically, the upper ends of the front and rear legs 162, 164 are received in and connected to the connectors 166. When the roll cage 106 is affixed to the frame 12, the rear legs 164 extend upward and forward from the rear roll cage supports 153 of the frame 12 while the front legs 162 extend upward and rearward from the front roll cage supports 132 of the frame 12. The front legs 162 are bent near their center points. Brackets 167 are provided at the bend in the front legs 162.

In this implementation, each of the front legs 162 comprises alignment projections 185 (partially shown in FIG. 13C) extending downwardly from a surface of the lower end of the front legs 162. The alignment projections 185 are configured to be inserted in the alignment openings 314 of the bracket 302 of the front roll cage supports 132.

Figure 9:
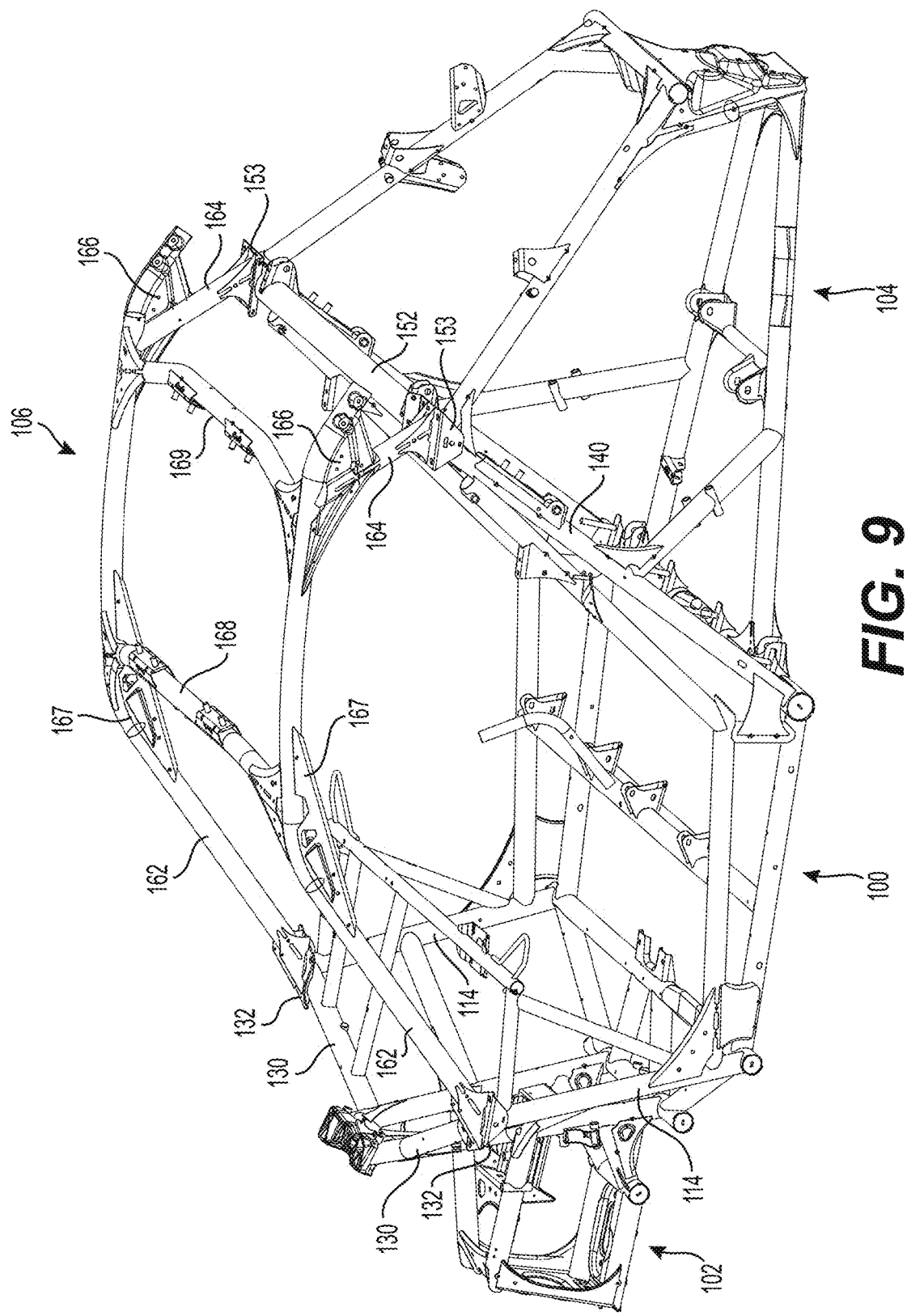
FIG. 9 is a rear, left side perspective view of the frame of the vehicle with a roll cage affixed thereto.

As shown in FIGS. 9 and 11, a front cross-member 168 is connected to and extends between the front legs 162. The cross-member 168 is connected to the front legs 162 at points disposed slightly rearward of the bends in the front legs 162. The cross-member 168 has two angled portions and a lateral portion disposed between the angled portions. The angled portions of the cross-member 168 extend upward, rearward and laterally inward from the front legs 162. A rear cross-member 169 is connected to and extends between the front legs 162. The cross-member 169 is disposed rearward of the cross-member 168. The cross-member 169 is connected to the front legs 162 at points disposed forward of the upper ends of the rear legs 164. The cross-member 169 has two angled portions and a lateral portion disposed between the angled portions. The angled portions of the cross-member 169 extend rearward and laterally inward from the front legs 162. As best seen in FIG. 12, the lateral portion of the cross-member 168 is longer than the lateral portion of the cross-member 169. A generally H-shaped frame structure 170 (see FIGS. 11 and 12) is connected by brackets 171 between the cross-members 168, 169. The H-shaped frame structure 170 extends over the central portion of the cockpit area 22. As can be seen in FIG. 10, the H-shaped frame structure 170 is arched and is vertically higher than the top of the front legs 162. The roll cage 106 also comprises legs 172 (see FIG. 10) connected to the connectors 166 and extending rearward, downward and laterally inward therefrom. The legs 172 extend through the rear fenders 50 and are connected to the floor 58 of the cargo space 56. Brackets (not shown) connect the rear of the legs 172 to the rear portion 104 of the frame 12.

It is noted that FIGS. 9, 11 and 12 which depict the roll cage 106 do not show certain components of the roll cage 106 for simplicity, including the legs 172 and/or the H-shaped frame structure 170.

The roll cage 106 is welded to the frame 12. Notably, as mentioned above, the front and rear legs 162, 164 of the roll cage 106 are welded to the front and rear roll cage supports 132, 153. More specifically, in this implementation, as shown in FIG. 13A depicting the left rear leg 164, a lower end of each rear leg 164 is welded to the upper surface 310 of the bracket 302 of a respective one of the rear roll cage supports 153 such that a weld 311 is formed between the upper surface 310 and the lower end of the rear leg 164. In order to strengthen the connection between the rear leg 164 and the roll cage support 153, in this implementation, the roll cage 106 includes flanges 316 affixed to the lower end of the rear leg 164 and positioned laterally at either side of the rear leg 164. The flanges 316 are welded or otherwise affixed to the lower ends of the legs 164 and welded to the upper surface 310 of the bracket 302 of the rear roll cage support 153 such that a weld 313 is formed between the flanges 316 and the rear roll cage support 153. In this implementation, each rear leg 164 is welded to the bracket 302 of the corresponding rear roll cage support 153 between laterally-adjacent ones of the openings 312 of the bracket 302 such that the welds 311, 313 are disposed laterally between the inboard ones of the openings 312 (i.e., closest to the centerline 37 of the vehicle 10) and the outboard ones of the openings 312 (i.e., furthest from the centerline 37 of the vehicle 10).

Figure 13B:
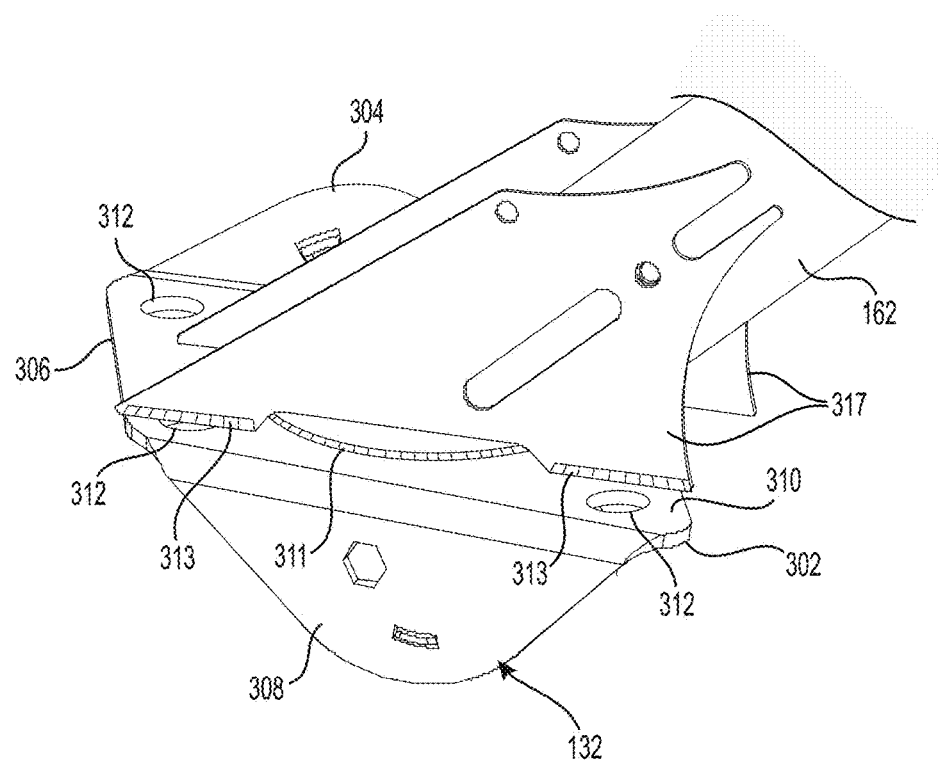
FIG. 13B is a perspective view of the front, left roll cage support with a front, left leg of the roll cage affixed thereto.
Figure 13C:
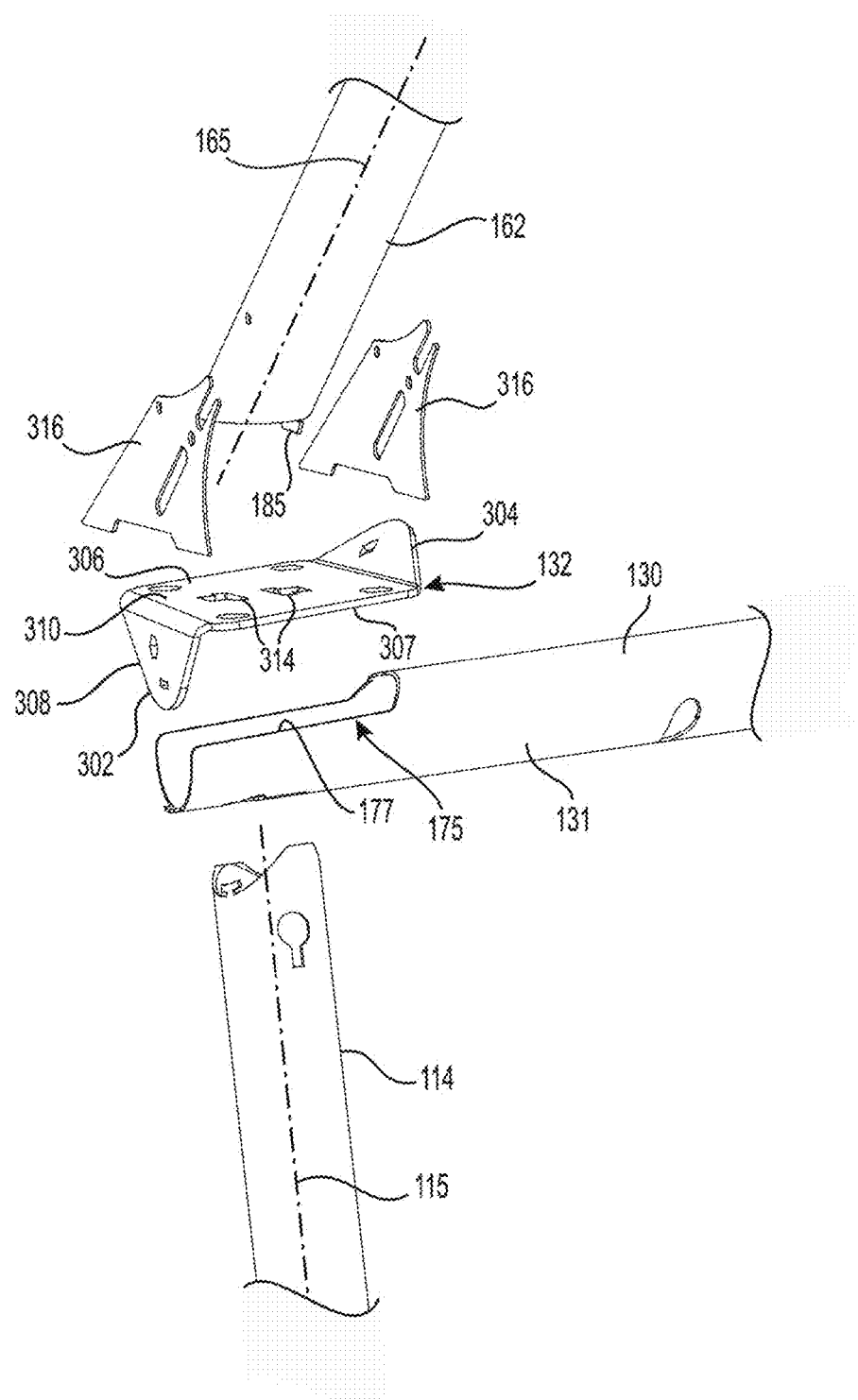
FIG. 13C is an exploded view of the front, left roll cage support with the left leg of the roll cage and a portion of the frame to which the front, left roll cage support is affixed.

As shown in FIG. 13B depicting the left front leg 162, the front legs 162 are welded to the front roll cage supports 132 in a similar manner, including flanges 317 affixed to the lower ends of the front legs 162 and welded to the front roll cage supports 132. In this implementation, at least one of the flanges 317 is positioned over a given one of the openings 312 of the bracket 302 of the front roll cage support 132. In particular, the outboard flange 317 (i.e., the flange 317 furthest from the centerline 37) is positioned over the given opening 312 such that part of the weld 313 between the outboard flange 317 and the bracket 302 is positioned over the opening 312 and obstructs the opening 312.

As best shown in FIG. 10, when the roll cage 106 is welded to the frame 12, a center axis 165 of each of the front legs 162 intersects a center axis 115 of a corresponding one of the generally vertical members 114 (i.e., the generally vertical member 114 supporting the corresponding front roll cage support 132 to which the given front leg 162 is welded).

As will be discussed below, the roll cage 106 can be replaced with a replacement roll cage 206 with relative ease. Replacement of the roll cage 106 may be desired for example when the roll cage 106 has been damaged.

Figure 14:
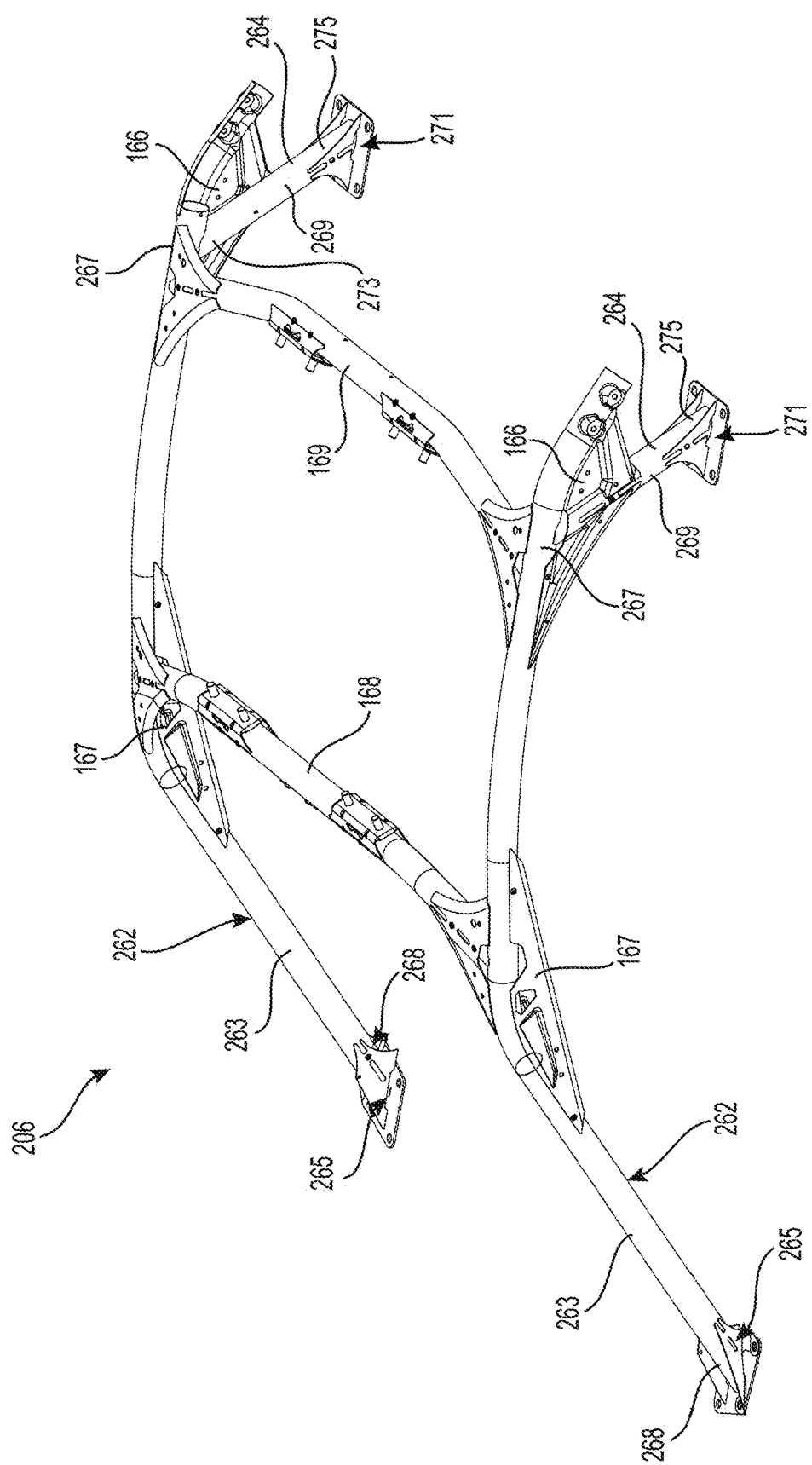
FIG. 14 is a rear, left side perspective view of a portion of a replacement roll cage.

With reference to FIG. 14, the replacement roll cage 206 is substantially similar in structure to the roll cage 106 with similar components being denoted with the same reference characters. However, the replacement roll cage 206 is configured to be affixed to the roll cage supports 132, 153 in a manner other than by welding and is thus structured accordingly. It is noted that FIG. 14 does not depict the replacement roll cage 206 in full, including for example the legs 172 and the H-shaped frame structure 170.

The replacement roll cage 206 comprises front legs 262 and rear legs 264 which are connected to one another by the connectors 166 and are configured for removably affixing to the roll cage supports 132, 153 of the frame 12 in a manner that will be discussed in more detail below. Each of the front legs 262 comprises an elongated member 263 and a frame mounting structure 265 for connecting the front leg 262 to the frame 12. An upper end 267 of the elongated member 263 is received in the connector 166. The frame mounting structure 265 is affixed to a lower end 268 of the elongated member 263. Similarly, each of the rear legs 264 comprises an elongated member 269 and a frame mounting structure 271 for connecting the rear leg 264 to the frame 12. An upper end 273 of the elongated member 269 is received in the connector 166. The frame mounting structure 271 is affixed to a lower end 275 of the elongated member 269.

Figure 15:
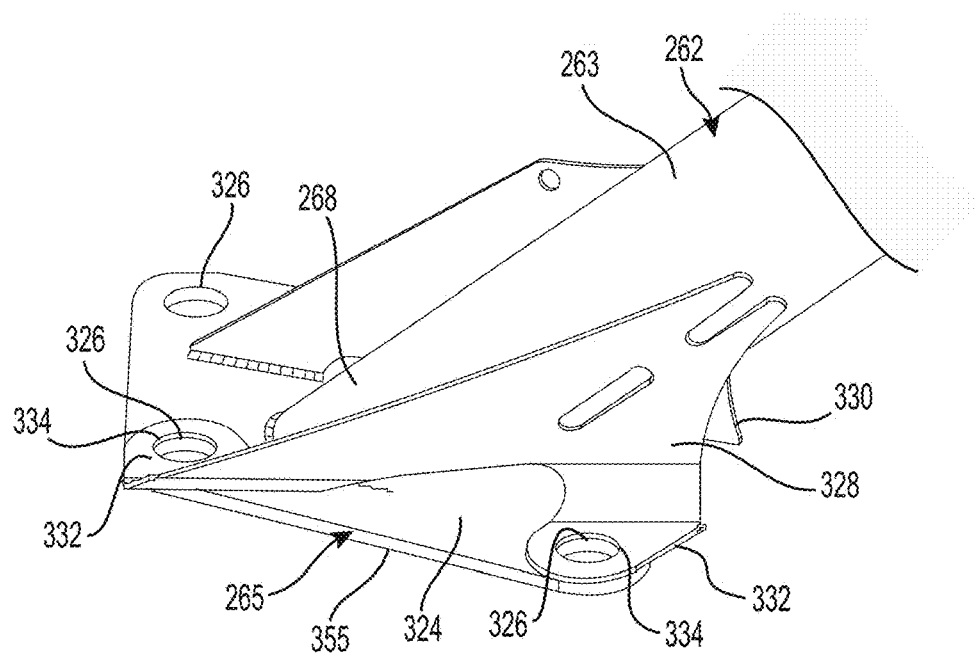
FIG. 15 is a perspective view of a portion of a front, left leg of the replacement roll cage of FIG. 14.

With reference to FIG. 15 (which shows the left front leg 262, the right front leg 262 being a mirror image thereof), the frame mounting structure 265 of each front leg 262 comprises a mounting flange 324 affixed to the lower end 268 of the elongated member 263. For instance, in this example, the mounting flange 324 is welded to the lower end 268 of the elongated member 263. The mounting flange 324 is shaped to generally match a shape of the central portion 306 of the bracket 302 of the front roll cage supports 132. The mounting flange 324 comprises a plurality of openings 326 arranged in a pattern matching a pattern of the openings 312 of the front roll cage support 132. In order to reinforce a connection between the mounting flange 324 and the elongated member 263, the frame mounting structure 265 also comprises a pair of reinforcing flanges 328, 330 disposed on either lateral side of the elongated member 263. The flanges 328, 330 are connected to the lower end 268 of the elongated member 263 and to the mounting flange 324. In this example, the flanges 328, 330 are welded to the elongated member 263. The inboard flange 330 is also welded to the mounting flange 324. Furthermore, in this implementation, the outboard reinforcing flange 328 (i.e., a reinforcing flange that is furthest from a centerline of the replacement roll cage 206) is configured differently from the inboard flange 330. In particular, the outboard reinforcing flange 328 comprises a pair of extensions 332 that extend parallel to the mounting flange 324. Each extension 332 comprises an opening 334 that is aligned with a corresponding opening 326 of the mounting flange 324. The outboard flange 328 is not welded to the mounting flange 324.

Figure 16:
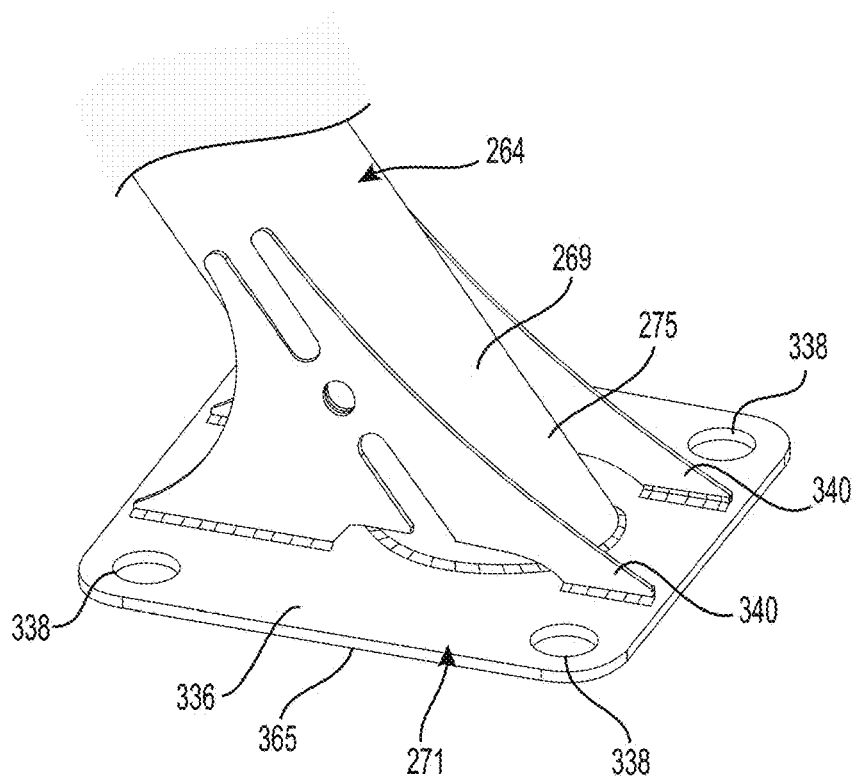
FIG. 16 is a perspective view of a portion of a rear, left leg of the replacement roll cage of FIG. 14.

With reference to FIG. 16 (which shows the left rear leg 264, the right rear leg 264 being a mirror image thereof), the frame mounting structure 271 of each rear leg 264 is substantially similar to the frame mounting structures 265 of the front legs 262. Notably, the frame mounting structure 271 comprises a mounting flange 336 affixed to the lower end 275 of the elongated member 269. In this example, the mounting flange 336 is welded to the lower end 275 of the elongated member 269. The mounting flange 336 is shaped to generally match the shape of the central portion 306 of the bracket 302 of the rear roll cage supports 153. The mounting flange 336 comprises a plurality of openings 338 arranged in a pattern matching a pattern of the openings 312 of the rear roll cage support 153. The frame mounting structure 271 also comprises a pair of reinforcing flanges 340 disposed on either lateral side of the elongated member 269. The reinforcing flanges 340 are connected to the lower end 275 of the elongated member 269 and to the mounting flange 336. Both inboard and outboard reinforcing flanges 340 are substantially similar. Unlike the outboard flange 328 of the frame mounting structure 265 of the front leg 262, the flanges 340 do not include extensions that extend parallel to the mounting flange 336. Rather, the reinforcing flanges 340 are generally transversal to the mounting flange 336. Nevertheless, it is contemplated that the reinforcing flanges 340 could comprise extensions, such as the extensions 332, which extend parallel to the mounting flange 336 in alternative implementations.

The mounting flanges 324, 336 are parallel to one another. More specifically, with reference to FIGS. 15 and 16, a lower surface 355 of each mounting flange 324 and a lower surface 365 of each mounting flange 336 extends generally horizontally such that the lower surfaces 355, 365 are parallel to one another.

Figure 17:
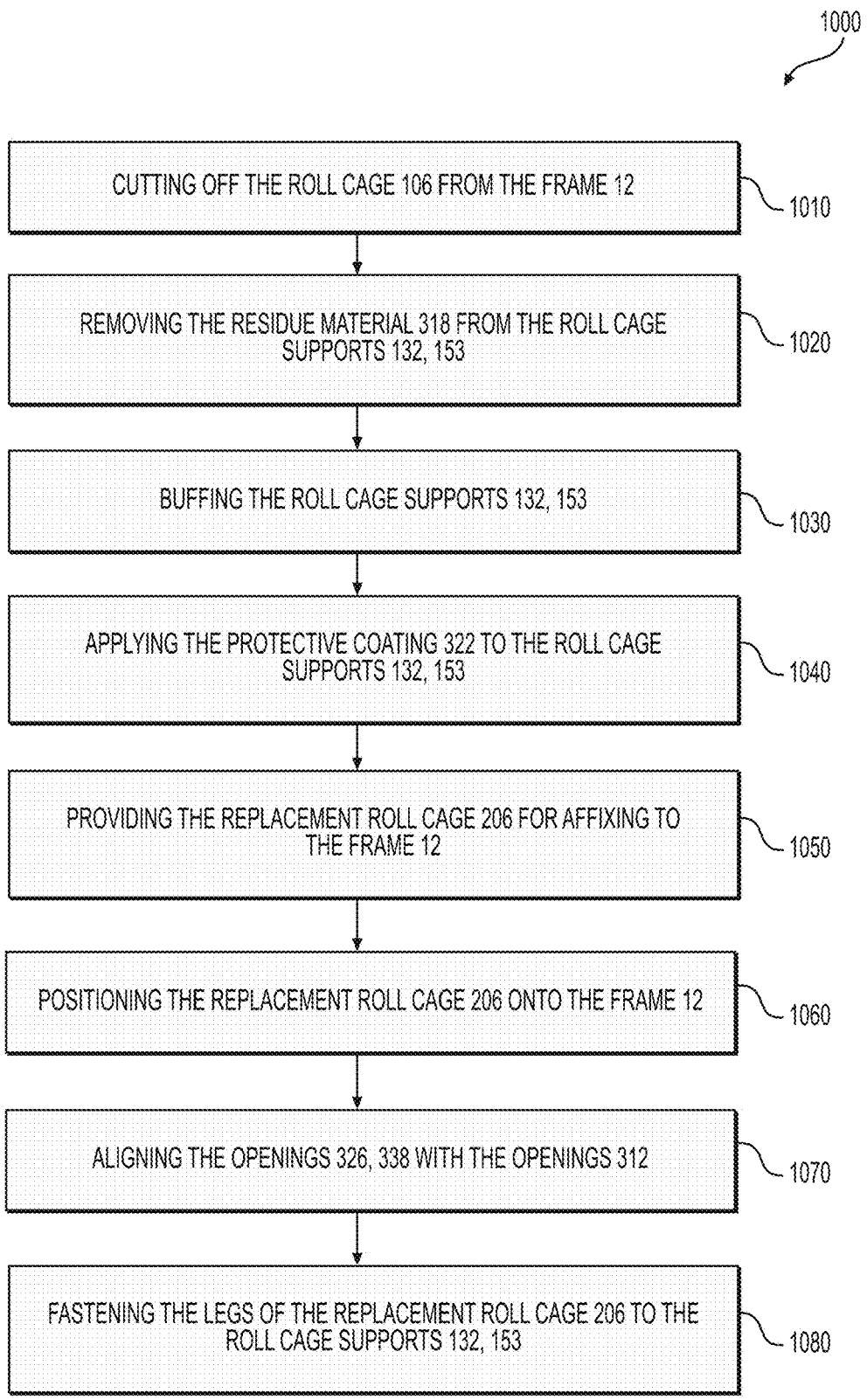
FIG. 17 is a block diagram representation of a method for replacing the roll cage of FIG. 9 with the replacement roll cage of FIG. 14.

A method 1000 for replacing the roll cage 106 with the replacement roll cage 206 will now be described with reference to FIG. 17.

At step 1010, the roll cage 106 is cut off from the frame 12 in order to separate the roll cage 106 from the frame 12. More specifically, each of the front and rear legs 162, 164 of the roll cage 106 is cut at a point above a respective one of the front and rear roll cage supports 132, 153. The legs 162, 164 are cut such as to leave minimal material from the legs 162, 164 on the roll cage supports 132, 153. For instance, in this example, each leg 162, 164 is cut above and proximate to the welds 311, 313 (best seen in FIG. 13) affixing that leg 162, 164 to the corresponding roll cage support 132, 153. Preferably, the legs 162, 164 are cut 2 mm to 4 mm from the upper surface 310 of the central portion 306 of the bracket 302. Nevertheless, the legs 162, 164 may be cut up to 10 mm or more from the upper surface 310 of the central portion 306 of the bracket 302. It is contemplated that, if the welds 311, 313 are thick enough, the roll cage 106 may be cut off from the frame 12 by cutting the welds 311, 313 rather than the legs 162, 164.

The legs 162, 164 may be cut in any suitable way. For example, a reciprocating saw may be used to cut the legs 162, 164. The legs 162, 164 may be cut in any other way in other implementations such as, for example, with a hacksaw or acetylene torch. Moreover, the roll cage 106 may be supported while the legs 162, 164 are being cut. For example, a hoist may be attached to the roll cage 106 to support the roll cage 106 once it has been separated from the frame 12. The roll cage 106 is discarded elsewhere once the roll cage 106 is cut off from the frame 12.

Figure 18:
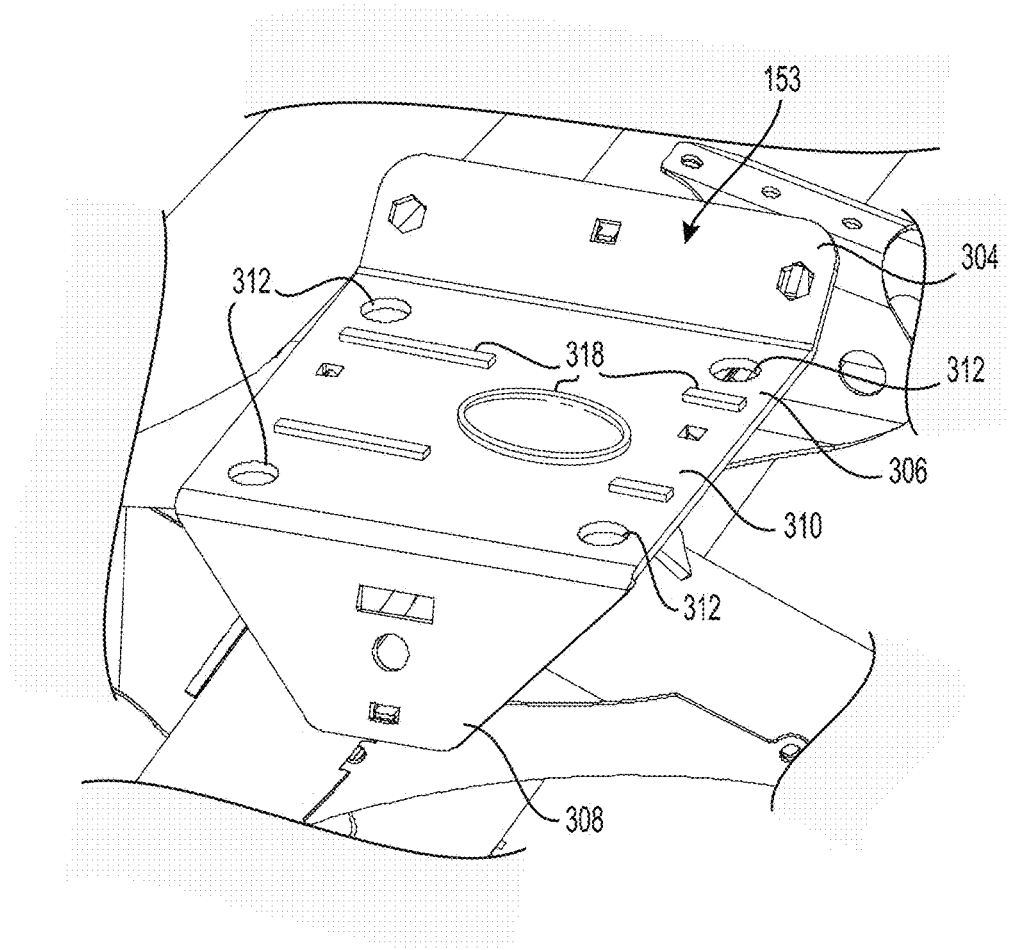
FIG. 18 is a perspective view of the rear, left roll cage support of the frame after the roll cage is cut off from the frame.
Figure 19:
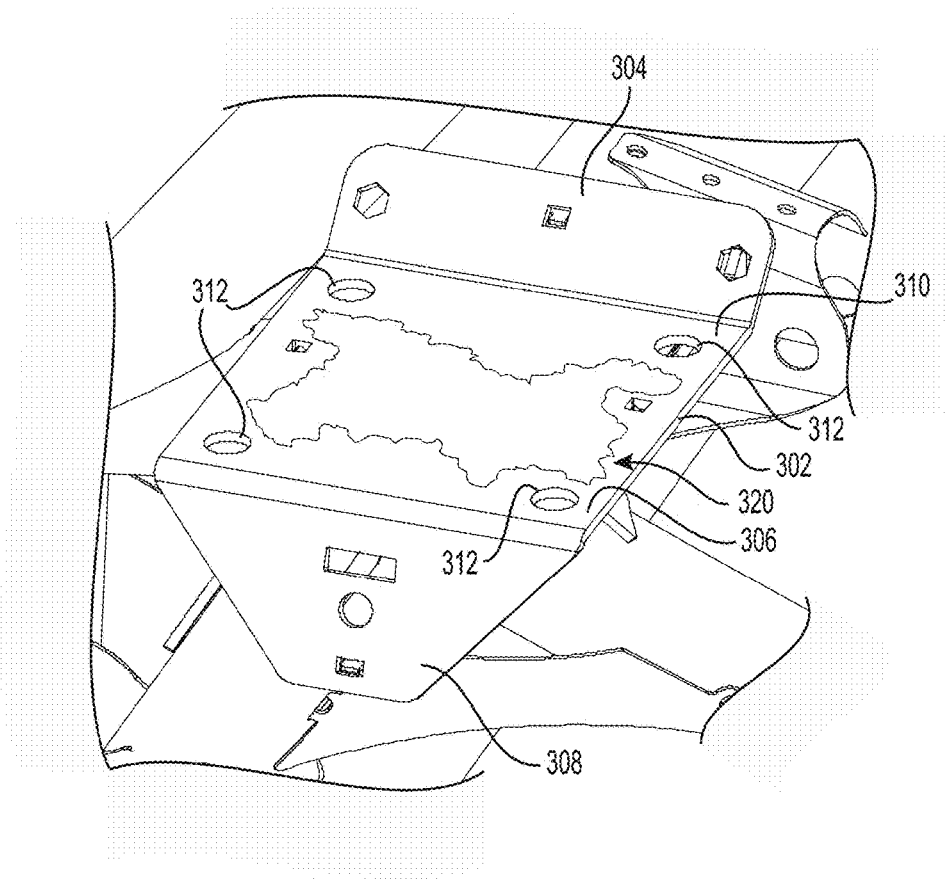
FIG. 19 is a perspective view of the rear, left roll cage support of the frame after residue material from the roll cage is removed from the rear, left roll cage support.

As shown in FIG. 18, once the roll cage 106 has been separated from the frame 12, residue material 318 of the roll cage 106 remains attached to the roll cage supports 132, 153. The residue material 318 may include material from the front and rear legs 162, 164, the flanges 316, 317 and/or from the welds 311, 313 that attached the roll cage 106 to the roll cage supports 132, 153. At step 1020, the residue material 318 is removed from the roll cage supports 132, 153. In this implementation, the residue material 318 is ground off from the roll cage supports 132, 153 with a grinder equipped with a grinding disc. The residue material 318 may be removed from the roll cage supports 132, 153 in any other suitable way in other implementations. As shown in FIG. 19, removal of the residue material 318 leaves an upper surface 320 of each roll cage support 132, 153 exposed (which may include at least in part the original upper surface 310).

Next, at step 1030, the upper surface 320 of the roll cage supports 132, 153 is buffed to ensure smoothness of the upper surface 320. The upper surface 320 may be buffed in any suitable way. In this example, a rotary buffer is used, along with a buffing compound, to buff the surface 320 of the roll cage supports 132, 153. Subsequently, at step 1040, with reference to FIG. 20, a protective coating 322 can be applied to the upper surface 320 of the roll cage supports 132, 153 to protect the roll cage supports 132, 153 from corrosion. In this example, the protective coating 322 comprises a rustproof paint.

Figure 20:
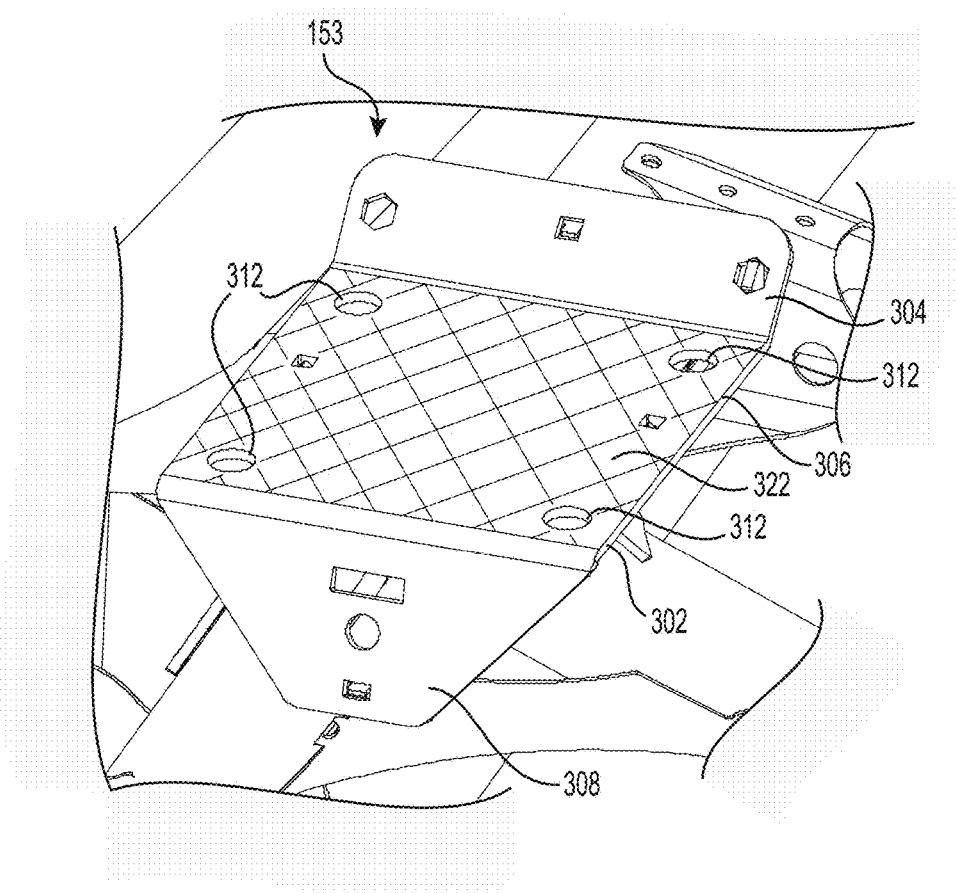
FIG. 20 is a perspective view of the rear, left roll cage support of the frame after a protective coating is applied to the rear, left roll cage support.

While FIGS. 18 to 20 only show the rear left roll cage supports 153 at certain instances of the method of replacing the roll cage 106, similar steps apply to the front roll cage supports 132 and the rear right roll cage supports 153.

Figure 21:
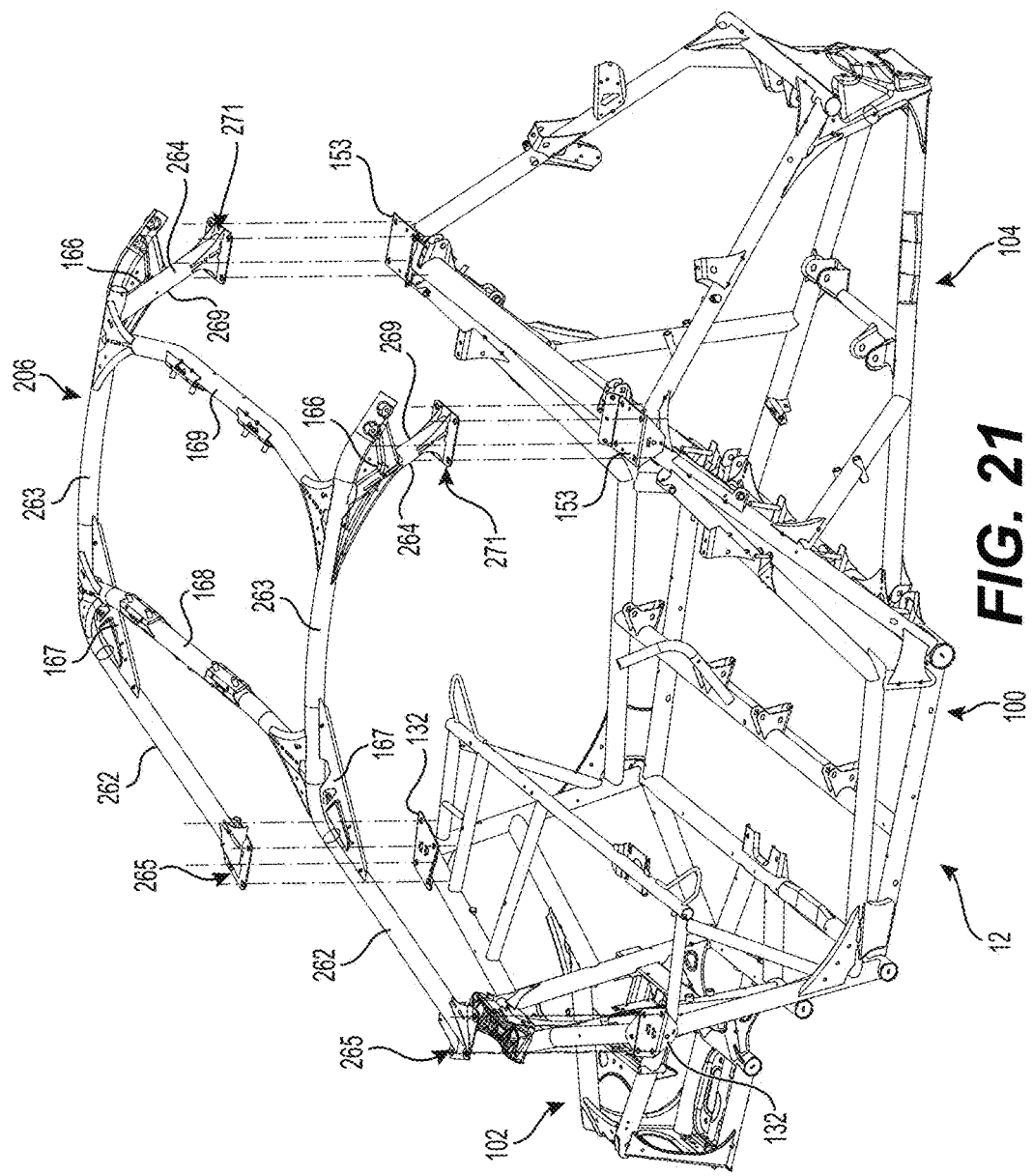
FIG. 21 is an exploded view of the frame and the replacement roll cage schematically showing an alignment of the replacement roll cage relative to the frame.
Figure 22:
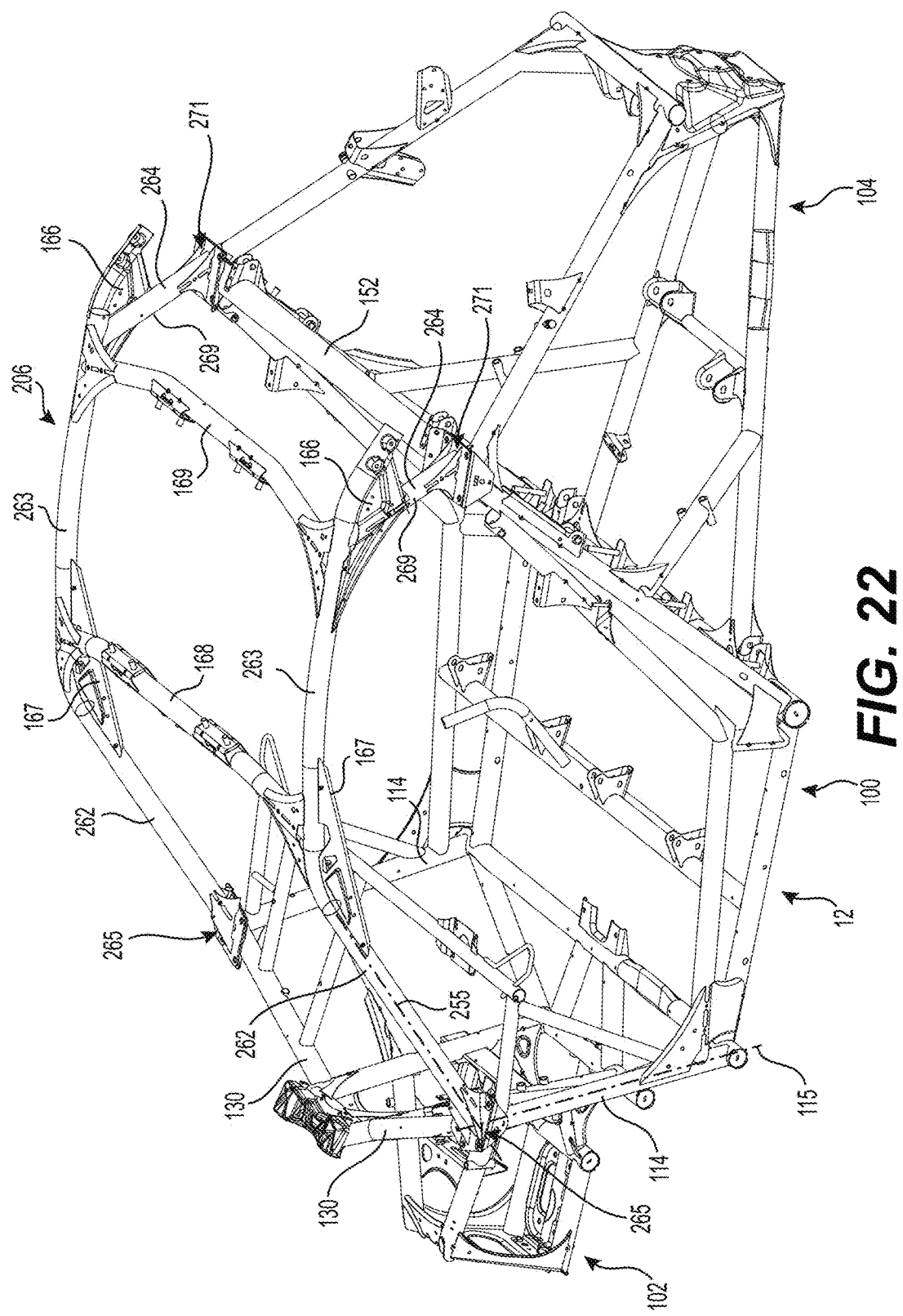
FIG. 22 is a rear, left side perspective view of the frame and the replacement roll cage mounted thereto.

At step 1050, as shown in FIG. 21, the replacement roll cage 206 is provided for removably affixing to the front and rear roll cage supports 132, 153 of the frame 12. At step 1060, and as shown in FIG. 22, the replacement roll cage 206 is positioned onto the frame 12 such that the front and rear legs 262, 264 are supported on the frame 12. For example, the replacement roll cage 206 may be lowered onto the frame 12 via a hoist such that the frame mounting structures 265, 271 of the front and rear legs 262, 264 are supported on the front and rear roll cage supports 132, 153 of the frame 12. More specifically, the mounting flanges 324, 336 of the frame mounting structures 265, 271 are positioned onto the central portion 306 of the bracket 302 of the front and rear roll cage supports 132, 153. This may be facilitated by the angled proximal portion 304 of the bracket 302. Notably, the angular orientation of the proximal portion 304 may be useful to guide the mounting flanges 324, 336 onto the central portion 306 of the bracket 302 as the replacement roll cage 206 is lowered onto the frame 12. Thus, positioning the replacement roll cage 206 onto the frame 12 includes placing the lower surfaces 355, 365 of the front and rear mounting flanges 324, 336 in parallel with the upper surfaces 320 of the brackets 302 of the front and rear roll cage supports 132, 153. Having positioned the replacement roll cage 206 onto the frame 12, at step 1070, the openings 326, 338 of the mounting flanges 324, 336 are aligned with the openings 312 of the front and rear roll cage supports 132, 153 as is schematically illustrated in FIG. 21.

In contrast to the original roll cage 106, when the mounting flange 324 of the frame mounting structure 265 of each front leg 262 of the replacement roll cage 206 is aligned with its corresponding front roll cage support 132, the openings 312 of the mounting bracket 302 of the front roll cage support 132 are unobstructed. Notably, because the extensions 332 of the outboard flange 328 comprise the openings 334, the outboard flange 328 does not obstruct the outboard openings 312. Moreover, each of the lower surfaces 355, 365 of the mounting flanges 324, 336 has a surface area that is equal to or less than a surface area of an upper surface of the central portion 306 of the bracket 302 of a corresponding one of the front and rear roll cage supports 132, 153. This may facilitate the positioning and aligning of the legs 262, 264 relative to the roll cage supports 132, 153.

Figure 23:
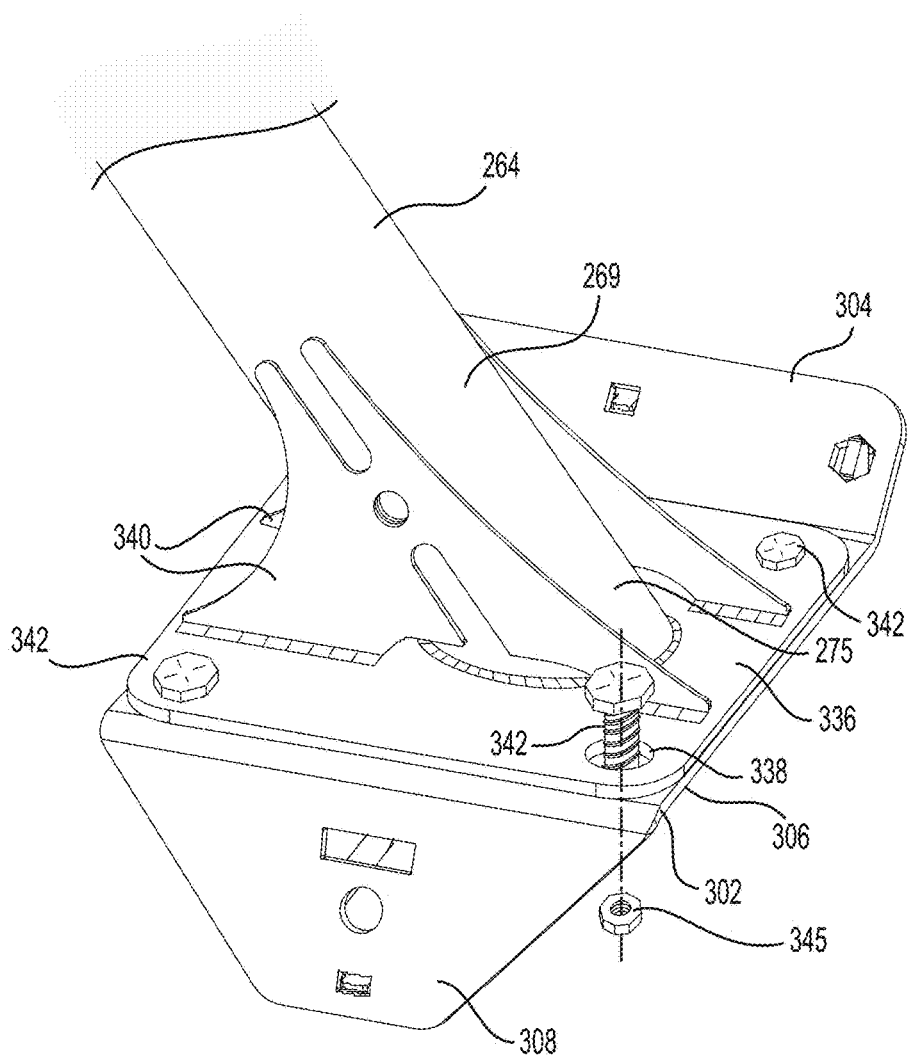
FIG. 23 is a perspective view of a rear leg of the replacement roll cage affixed to the rear roll cage support of the frame.

At step 1080, the replacement roll cage 206 is fastened to the frame 12. More specifically, the front and rear legs 262, 264 of the replacement roll cage 206 are fastened to the front and rear roll cage supports 132, 153 of the frame 12 respectively. Notably, in this implementation, as shown in FIG. 23 which depicts the fastening of the rear left leg 264 to the rear left roll cage support 153, a fastener 342 (e.g., a bolt) is inserted into each opening 338 of the mounting flange 336 of the frame mounting structure 271 and into the aligned opening 312 of the bracket 302. As shown in an exploded view in FIG. 23, a fastener receiving member 345 (e.g., a nut) secures the fastener 342 in place. It is contemplated that the fastener receiving member 345 may be integrated into the bracket 302 in some implementations (e.g., the openings 312 may be threaded). As best shown in FIG. 22, when the front and rear legs 262, 264 have been properly aligned with the front and rear roll cage supports 132, 153 and fastened thereto, a center axis 255 of the elongated member 263 of each of the front legs 262 intersects the center axis 115 of a corresponding one of the generally vertical members 114 (i.e., the generally vertical member 114 supporting the corresponding front roll cage support 132 to which the given front leg 262 is fastened).

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A method for replacing a roll cage of an off-road vehicle, the off-road vehicle comprising a frame and the roll cage affixed to the frame, the frame comprising a plurality of roll cage supports, the roll cage comprising a plurality of legs, each of the legs being welded to a respective one of the roll cage supports of the frame, the method comprising:
cutting off the roll cage from the frame;
providing a replacement roll cage for removably affixing to the frame, the replacement roll cage comprising a plurality of legs for removably affixing to the roll cage supports of the frame, each leg of the replacement roll cage comprising a mounting flange, the mounting flange comprising an opening for receiving a fastener;
positioning the replacement roll cage onto the frame such that the legs of the replacement roll cage are supported on the roll cage supports;
aligning the opening of the mounting flange of each leg of the replacement roll cage with a corresponding opening of each roll cage support;
fastening the legs of the replacement roll cage to the roll cage supports.

2. The method of claim 1, wherein said cutting comprises cutting each leg of the roll cage at a point above a respective roll cage support.

3. The method of claim 2, wherein the point above which each leg of the roll cage is cut is above a weld between the leg and the respective roll cage support.

4. The method of claim 2, wherein the point above which each leg of the roll cage is cut is up to 10 mm from an upper surface of the respective roll cage support.

5. The method of claim 1, further comprising removing residue material of the roll cage left on the roll cage supports after said cutting.

6. The method of claim 5, wherein said removing comprises grinding the residue material of the roll cage.

7. The method of claim 5, further comprising buffing the roll cage supports of the frame after said removing.

8. The method of claim 5, further comprising applying a protective coating to the roll cage supports after said removing.

9. The method of claim 1, wherein:
the mounting flanges of the legs of the replacement roll cage have lower surfaces that are parallel to one another; and
said positioning comprises placing the lower surfaces of the mounting flanges of the legs of the replacement roll cage in parallel with upper surfaces of the roll cage supports.

10. The method of claim 1, wherein said fastening comprises:
inserting a fastener into the opening of the mounting flange of each leg of the replacement roll cage and into the corresponding opening of the roll cage support; and
securing the fastener with a fastener receiving member.

* * * * *